US012230417B2

(12) United States Patent
Gwon et al.

(10) Patent No.: US 12,230,417 B2
(45) Date of Patent: Feb. 18, 2025

(54) SOLID ION CONDUCTOR, SOLID ELECTROLYTE INCLUDING THE SAME, ELECTROCHEMICAL DEVICE INCLUDING THE SAME, AND PREPARATION METHOD THEREOF

(71) Applicant: Samsung Electronics Co., Ltd., Suwon-si (KR)

(72) Inventors: Hyeokjo Gwon, Hwaseong-si (KR); Sungkyun Jung, Suwon-si (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 122 days.

(21) Appl. No.: 17/391,340

(22) Filed: Aug. 2, 2021

(65) Prior Publication Data

US 2022/0044837 A1 Feb. 10, 2022

(30) Foreign Application Priority Data

Aug. 6, 2020 (KR) ........................ 10-2020-0098821

(51) Int. Cl.
*H01M 10/0562* (2010.01)
*H01B 1/08* (2006.01)
(Continued)

(52) U.S. Cl.
CPC ........... *H01B 1/08* (2013.01); *H01B 13/0016* (2013.01); *H01M 4/0407* (2013.01);
(Continued)

(58) Field of Classification Search
CPC ..... H01M 10/0562; H01M 2300/0071; H01M 4/366; H01M 4/0407
See application file for complete search history.

(56) References Cited

U.S. PATENT DOCUMENTS 7,901,658 B2 3/2011 Weppner
8,658,317 B2 2/2014 Weppner
(Continued)

FOREIGN PATENT DOCUMENTS

CN 11370755 A * 7/2020
CN 111370755 A * 7/2020 .......... H01M 10/052
(Continued)

OTHER PUBLICATIONS

Binggong Yan, Ruthenium doped cubic-garnet structured solid electrolyte Li7La3Zr2-xRuxO12, 2016, Materials Technology: Advanced Performance Materials, vol. 31 No. 11, p. 623-627 (Year: 2016).*

(Continued)

*Primary Examiner* — Christopher P Domone
*Assistant Examiner* — Jonathan William Estes
(74) *Attorney, Agent, or Firm* — CANTOR COLBURN LLP

(57) ABSTRACT

A solid ion conductor including a garnet-type oxide represented by $Li_AM1_BLa_CM2_DZr_EM3_FM4_GO_HX_I$ (Formula 1), a solid electrolyte including the solid ion conductor, an electrochemical device including the ion conductor, and a method of preparing the ion conductor are disclosed. In Formula 1, M1 is a monovalent cation, a divalent cation, a trivalent cation, or a combination thereof, M2 is a monovalent cation, a divalent cation, a trivalent cation, or a combination thereof, M3 is a divalent cation, a trivalent cation, a tetravalent cation, a pentavalent cation, a hexavalent cation, or a combination thereof, M4 is Ir, Ru, Mn, Sn, or a combination thereof, X is a monovalent anion, a divalent anion, a trivalent anion, or a combination thereof, and $6 \leq A \leq 8$, $0 \leq B < 2$, $2.8 \leq C \leq 3$, $0 \leq D \leq 0.2$, $0 < E < 2.0$, $0 < F < 2.0$, $0 < G \leq 0.2$, $9 \leq H \leq 12$, and $0 \leq I \leq 2$ are satisfied.

23 Claims, 7 Drawing Sheets

(51) Int. Cl.
*H01B 13/00* (2006.01)
*H01M 4/04* (2006.01)
*H01M 4/36* (2006.01)

(52) U.S. Cl.
CPC ....... *H01M 4/366* (2013.01); *H01M 10/0562* (2013.01); *H01M 2300/0071* (2013.01)

(56) References Cited

U.S. PATENT DOCUMENTS

| | | | |
|---|---|---|---|
| 8,986,895 | B2 | 3/2015 | Ohta et al. |
| 10,361,455 | B2 | 7/2019 | Allenic et al. |
| 10,700,378 | B2 * | 6/2020 | Sakamoto ......... H01M 10/0562 |
| 2019/0044186 | A1 * | 2/2019 | Kim ...................... H01M 4/382 |
| 2019/0237800 | A1 * | 8/2019 | Liu ....................... H01M 4/623 |
| 2020/0083562 | A1 * | 3/2020 | Kim ................... H01M 50/449 |
| 2020/0259211 | A1 | 8/2020 | Sakamoto et al. |
| 2021/0066746 | A1 * | 3/2021 | Hou .................. H01M 10/0562 |
| 2022/0294000 | A1 * | 9/2022 | Ying .................... C01G 25/006 |

FOREIGN PATENT DOCUMENTS

| | | |
|---|---|---|
| KR | 101909727 B1 | 10/2018 |
| KR | 102102212 B1 | 4/2020 |
| KR | 1020200039713 A | 4/2020 |

OTHER PUBLICATIONS

Binggong Yan et al., "Ruthenium doped cubic-garnet structured solid electrolyte Li7La3Zr2-xRuxO12," Materials Technology, Advanced Performance Materials, Aug. 16, 2016, pp. 1-5.

* cited by examiner

SOLID ION CONDUCTOR, SOLID ELECTROLYTE INCLUDING THE SAME, ELECTROCHEMICAL DEVICE INCLUDING THE SAME, AND PREPARATION METHOD THEREOF

CROSS-REFERENCE TO RELATED APPLICATION

This application claims priority to Korean Patent Application No. 10-2020-0098821, filed on Aug. 6, 2020, in the Korean Intellectual Property Office, and all the benefits accruing therefrom under 35 U.S.C. § 119, the content of which is incorporated herein by reference in its entirety.

BACKGROUND

1. Field

The present disclosure relates to a solid ion conductor, a solid electrolyte including the solid ion conductor, a lithium battery including the solid electrolyte, and a method of preparing the ion conductor.

2. Description of Related Art

An all-solid secondary battery may provide improved stability by employing a solid electrolyte instead of a liquid electrolyte, and may provide improved energy density by using lithium metal as an anode active material.

A solid electrolyte is electrochemically stable within the charge-discharge voltage range of a secondary battery, and conducts lithium ions at room temperature.

As all-solid secondary batteries having improved performance are desired, there is a continuing need for a solid electrolyte having excellent physical properties in addition to excellent ion conductivity.

SUMMARY

Provided are solid ion conductors of a novel composition having reduced interfacial resistance.

Provided are solid electrolytes including the solid ion conductors.

Provided are electrochemical devices including the solid ion conductors.

Provided are methods of preparing the solid ion conductors.

Additional aspects will be set forth in part in the description which follows and, in part, will be apparent from the description, or may be learned by practice of the presented embodiments of the disclosure.

According to an aspect of an embodiment, a solid ion conductor includes: a garnet-type oxide represented by Formula 1:

  Formula 1 wherein, in Formula 1 above,
M1 is a monovalent cation, a divalent cation, a trivalent cation, or a combination thereof,
M2 is a monovalent cation, a divalent cation, a trivalent cation, or a combination thereof,
M3 is a divalent cation, a trivalent cation, a tetravalent cation, a pentavalent cation, a hexavalent cation, or a combination thereof,
M4 is Ir, Ru, Mn, Sn or a combination thereof,
X is a monovalent anion, a divalent anion, a trivalent anion, or a combination thereof, and
$6 \le A \le 8$, $0 \le B \le 2$, $2.8 \le C \le 3$, $0 \le D \le 0.2$, $0 < E < 2.0$, $0 < F < 2.0$, $0 < G \le 0.2$, $9 \le H \le 12$, and $0 \le I \le 2$.

According to an aspect of another embodiment, a solid electrolyte includes the solid ion conductor.

According to an aspect of another embodiment, an electrochemical device incudes a cathode; an anode; and a solid electrolyte layer disposed between the cathode and the anode, wherein the cathode, the anode, the solid electrolyte layer, or a combination thereof, comprises the solid ion conductor.

In another embodiment, an electrochemical device includes a cathode; an anode; a solid electrolyte layer disposed between the cathode and the anode; and a cathode protection layer on the cathode, an anode protection layer on the anode, a solid electrolyte protection layer on the solid electrolyte, or a combination thereof, wherein the cathode protection layer, the anode protection layer, the solid electrolyte protection layer, or a combination thereof comprises the solid ion conductor.

According to an aspect of another embodiment, a method of preparing a solid ion conductor includes: providing a precursor mixture including a precursor for forming a solid ion conductor; and heat-treating the precursor mixture under an oxidative atmosphere to provide a solid ion conductor including a garnet-type oxide represented by Formula 1.

A method of manufacturing an electrochemical device includes providing a cathode; providing an anode; and disposing a solid electrolyte layer between the cathode and the anode to manufacture the electrochemical device, wherein the cathode, the anode, the solid electrolyte layer, or a combination thereof comprises the solid ion conductor.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
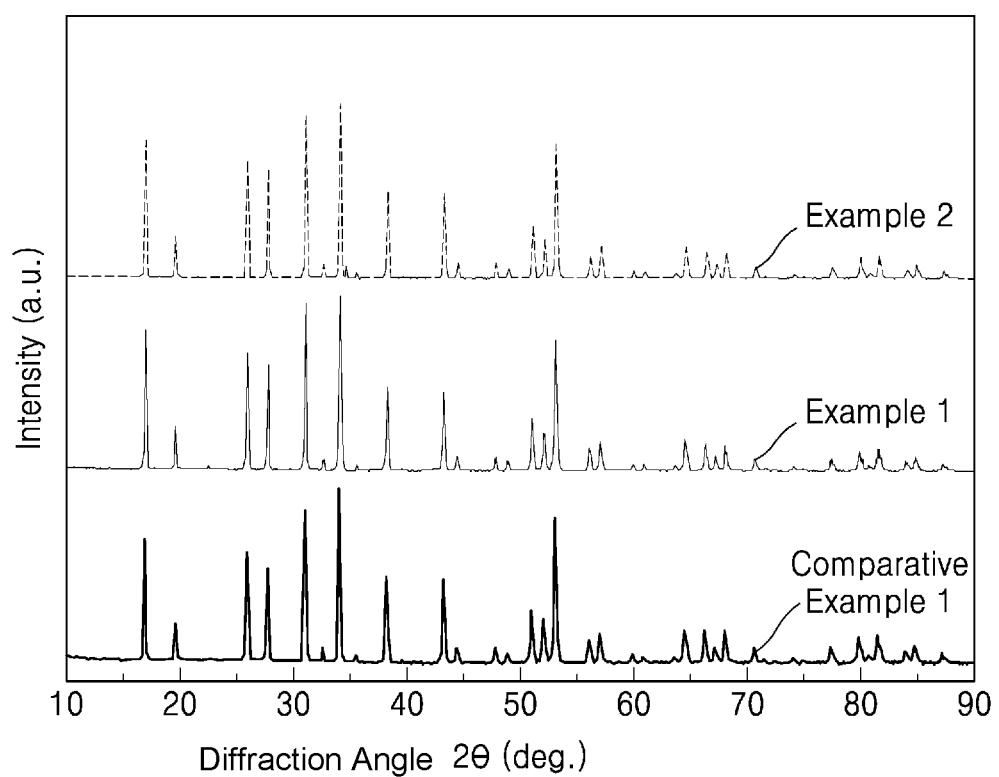
FIG. 1 is a graph of intensity (arbitrary units, a.u.) versus diffraction angle (degrees 2θ) and shows the results of powder X-ray diffraction analysis of solid ion conductors prepared in Example 1, Example 2, and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

Various embodiments are illustrated in the attached drawings. However, the present inventive concept may be embodied in many different forms, and should not be construed as being limited to the embodiments described herein. Rather, these embodiments are provided such that the present disclosure may be made thorough and complete, and will sufficiently transfer the scope of the present creative step to those skilled in the art. The same reference numerals designate the same components.

When a component is mentioned to be placed "on" another component, it will be understood that it can be directly on another component or that intervening component may be interposed therebetween. In contrast, when a component is mentioned to be "directly on" another component, there are no intervening elements present.

Although the terms "first", "second", "third", etc., may be used herein to describe various elements, components, regions, and/or layers, these elements, components, regions, and/or layers should not be limited by these terms. These terms are only used to distinguish one element, component, region, or layer from another element, component, region, or layer. Accordingly, a first component, a first element, a first area, a first layer or a first region described below may be referred to as a second component, a second element, a second area, a second layer or a second region without departing from the teachings of this specification.

The terms used in this specification are for describing only specific embodiments and are not intended to limit the present inventive step. The singular form as used herein is intended to include the plural form including "at least one" unless the content clearly dictates otherwise. "At least one" should not be construed as limiting to the singular form. As used herein, the term "and/or" includes any and all combinations of one or more of the list items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms such as "beneath", "under", "below", "on", "over", "above", etc. may be used herein to easily describe the relationship of one component or feature to another component or feature. It will be understood that spatially relative terms are intended to encompass different directions of a device in use or operation in addition to the directions shown in the drawings. For example, if the device in the drawings is turned over, a component described as "beneath" or "under" will be oriented "over" the other component or feature. Thus, the exemplary term "below" may encompass both an upward and downward direction. The device may be placed in different directions (rotated 90° or rotated in different directions), and spatially relative terms as used herein may be interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used in this specification have the same meaning as those commonly understood by a person skilled in the art to which this disclosure belongs. In addition, it will also be understood that terms as defined in a commonly used dictionary should be construed as having a meaning consistent with their meaning within the context of the relevant technology and the present disclosure, and should not be interpreted as an idealized or excessively formal meaning.

Embodiments are described herein with reference to cross section illustrations that are schematic illustrations of idealized embodiments. As such, variations from the shape of the component should be expected as a result of, for example, manufacturing techniques and/or tolerances. Accordingly, embodiments described herein should not be construed as being limited to the specific shapes of regions as shown herein, but should include variations in shapes resulting from, for example, manufacturing. For example, an area shown or described as being flat may typically have rough and/or non-linear characteristics. Moreover, the sharply drawn angles may be round. Accordingly, the regions shown in the drawings are schematic in nature, and their shapes are not intended to show the exact shape of the region, and are not intended to limit the scope of the present claims.

The term "group" means a group of the periodic table of elements according to the International Federation of Pure and Applied Chemistry ("IUPAC") Group 1-18 Classification System.

While specific embodiments have been described, alternatives, modifications, variations, improvements, and substantial equivalents that are currently unexpected or unforeseeable may occur to the applicant or those skilled in the art. Accordingly, it is intended that the appended claims, which may be filed and amended, include all such alternatives, modifications, variations, improvements and substantial equivalents.

Hereinafter, a solid ion conductor according to an embodiment, a solid electrolyte including the solid ion conductor, an electrochemical cell including the solid ion conductor, and a method of preparing the solid ion conductor will be described in more detail.

Solid Ion Conductor

A solid ion conductor according to an embodiment includes: a garnet-type oxide represented by Formula 1:

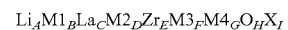

$$Li_A M1_B La_C M2_D Zr_E M3_F M4_G O_H X_I$$  Formula 1 wherein in Formula 1,
  M1 is a monovalent cation, a divalent cation, a trivalent cation, or a combination thereof,
  M2 is a monovalent cation, a divalent cation, a trivalent cation, or a combination thereof, M3 is a divalent cation, a trivalent cation, a tetravalent cation, a pentavalent cation, a hexavalent cation, or a combination thereof, M4 is Ir, Ru, Mn, Sn or a combination thereof, X is a monovalent anion, a divalent anion, a trivalent anion, or a combination thereof, and $6 \leq A \leq 8$, $0 \leq B \leq 2$, $2.8 \leq C \leq 3$, $0 \leq D \leq 0.2$, $0 < E < 2.0$, $0 < F < 2.0$, $0 < G \leq 0.2$, $9 \leq H \leq 12$, and $0 \leq I \leq 2$ are satisfied.

The solid ion conductor as described herein has excellent ion conductivity and an electrochemically stable voltage window within the driving voltage range of a secondary battery. A solid ion conductor normally includes elements whose oxidation number does not change within the driving voltage range of the secondary battery, and excludes elements having electrochemical activity, e.g., elements that are oxidized or reduced within the driving voltage range of the secondary battery. In a solid ion conductor including electrochemically stable elements, a charge transfer reaction rate decreases at the surface thereof. For example, a solid ion conductor exhibits high interfacial resistance at an interface with a lithium metal. Accordingly, the internal resistance of a secondary battery including such a solid ion conductor increases, and the charge-discharge characteristics of the secondary battery deteriorate.

In contrast, since the solid ion conductor including a garnet-type oxide represented by Formula 1 contains elements such as Ir, Ru, Mn, or Sn, which are electrochemically active within the driving voltage range of a secondary battery in a certain content range, the charge transfer reaction rate thereof increases as compared with that of an alternative solid ion conductor. Therefore, the solid ion conductor including the garnet-type oxide represented by Formula 1 has reduced interfacial resistance with a lithium metal, in addition to excellent lithium ion conductivity. As a result, the reversibility of an electrode reaction of a secondary battery including the solid ion conductor including the garnet-type oxide represented by Formula 1 is improved. Without wishing to be bound by theory, it is believed that when the content of elements having electrochemical activity in the garnet-type oxide represented by Formula 1 is greater than that as defined in Formula 1, side reactions on the surface of the solid ion conductor may increase, and thus the interface resistance thereof may increase. In Formula 1, M3 may be a cation of an element except for Ir, Ru, Mn, and Sn.

Garnet is a silicate that can be referred to using the formula $A_3X_2(SiO_4)_3$, wherein A is a divalent cation, and X is a trivalent cation. As used herein, the term "garnet" or "garnet-like" means that the compound is isostructural with garnet, e.g., $Mg_3Al_2(SiO_4)_3$, and may have cubic symmetry.

In Formula 1, for example, $6 \leq A \leq 7.9$, $6 \leq A \leq 7.8$, $6 \leq A \leq 7.5$, $6 \leq A \leq 7.2$, or $6 \leq A \leq 7$ is satisfied. In Formula 1, for example, $2.8 \leq C \leq 3$, $2.85 \leq C \leq 3$, $2.9 \leq C \leq 3$, or $2.95 \leq C \leq 3$ is satisfied. In Formula 1, for example, $0 < E \leq 1.9$, $0 < E \leq 1.8$, $0 < E \leq 1.7$, $0 < E \leq 1.6$, or $0 < E \leq 1.5$. In Formula 1, for example, $0 < F \leq 1.0$, $0 < FE \leq 0.9$, $0 < F \leq 0.8$, $0 < F \leq 0.7$, $0 < F \leq 0.6$, or $0 < F \leq 0.5$ is satisfied. In Formula 1, for example, $0.001 < G \leq 0.2$, $0.01 < G \leq 0.2$, $0 < G \leq 0.19$, $0 < G \leq 0.18$, or $0 < G \leq 0.17$ is satisfied.

In Formula 1, examples of the monovalent cation may include Na, K, Rb, Cs, H, or Fr, and examples of the divalent cation may include Mg, Ca, Ba, or Sr. Examples of the trivalent cation may include In, Sc, Cr, Au, B, Al, or Ga, and examples of the tetravalent cation may include Sn, Ti, Mn, Ir, Ru, Pd, Mo, Hf, Ge, V, or Si. Examples of the pentavalent cation may include Nb, Ta, Sb, V, and P. Examples of the hexavalent cation may include Cr, Mo or W.

In the solid ion conductor, for example, the garnet-type oxide represented by Formula 1 may be a garnet-type oxide represented by Formula 2:

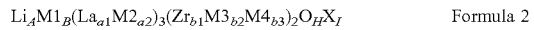

$$Li_AM1_B(La_{a1}M2_{a2})_3(Zr_{b1}M3_{b2}M4_{b3})_2O_HX_I \qquad \text{Formula 2}$$

wherein, in Formula 2,

M1 is a monovalent cation, a divalent cation, a trivalent cation, or a combination thereof, M2 is a monovalent cation, a divalent cation, a trivalent cation, or a combination thereof, M3 is a divalent cation, a trivalent cation, a tetravalent cation, a pentavalent cation, a hexavalent cation, or a combination thereof, M4 is Ir, Ru, Mn, Sn or a combination thereof, X is a monovalent anion, a divalent anion, a trivalent anion, or a combination thereof, $6 \leq A \leq 8$, $0 \leq B < 2$, $9 \leq H \leq 12$, and $0 \leq I \leq 2$ are satisfied, and $a1 + a2 = 1$, $0 < a1 \leq 1$, $0 \leq a2 \leq 0.067$, $b1 + b2 + b3 = 1$, $0 < b1 < 1$, $0 < b2 < 1$, and $0 < b3 \leq 0.1$ are satisfied.

In Formula 2, for example, $0 < b1 \leq 0.95$, $0 < b1 \leq 0.9$, $0 < b1 \leq 0.85$, $0 < b1 \leq 0.8$, or $0 < b1 \leq 0.75$ is satisfied. In Formula 2, for example, $0 < b2 \leq 0.5$, $0 < b2 \leq 0.45$, $0 < b2 \leq 0.4$, $0 < b2 \leq 0.35$, $0 < b2 \leq 0.3$, or $0 < b2 \leq 0.25$ is satisfied. In Formula 2, for example, $0 < b3 \leq 0.095$, $0 < b1 \leq 0.090$, $0 < b1 \leq 0.085$, $0 < b1 \leq 0.080$, or $0 < b1 \leq 0.075$ is satisfied.

In the solid ion conductor, for example, the garnet-type oxide represented by Formula 1 may be a garnet-type oxide represented by Formula 3:

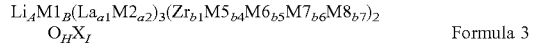

$$Li_AM1_B(La_{a1}M2_{a2})_3(Zr_{b1}M5_{b4}M6_{b5}M7_{b6}M8_{b7})_2O_HX_I \qquad \text{Formula 3}$$

wherein, in Formula 3,

M1 is a monovalent cation, a divalent cation, a trivalent cation, or a combination thereof, M2 is a monovalent cation, a divalent cation, a trivalent cation, or a combination thereof, M5, M6, and M7 are each independently a divalent cation, a trivalent cation, a tetravalent cation, a pentavalent cation, a hexavalent cation, or a combination thereof, M8 is Ir, Ru, Mn, Sn, or a combination thereof, X is a monovalent anion, a divalent anion, a trivalent anion, or a combination thereof, $6 A \leq 8$, $0 \leq 1B < 2$, $9 \leq H \leq 12$, and $0 \leq I \leq 2$ are satisfied, and $a1 + a2 = 1$, $0 < a1 \leq 1$, $0 \leq 2 \leq 0.067$, $b1 + b4 + b5 + b6 + b7 = 1$, $0 < b1 < 1$, $0 < b4 < 1$, $0 < b5 < 1$, $0 \leq b6 < 1$, and $0 < b7 \leq 0.1$ are satisfied.

In Formula 3, for example, $0 < b1 \leq 0.95$, $0 < b1 \leq 0.90$, $0 < b1 \leq 0.85$, $0 < b1 \leq 0.80$, $0 < b1 \leq 0.75$, $0 < b1 \leq 0.6$, $0 < b1 \leq 0.5$, $0 < b1 \leq 0.45$, $0 < b1 \leq 0.4$, $0 < b1 \leq 0.35$, $0 < b1 \leq 0.3$, or $0 < b1 \leq 0.25$ is satisfied. In Formula 3, for example, $0 < b4 \leq 0.5$, $0 < b4 \leq 0.45$, $0 < b4 \leq 0.4$, $0 < b4 \leq 0.35$, $0 < b4 \leq 0.3$, or $0 < b4 \leq 0.25$ is satisfied. In Formula 3, for example, $0 < b5 \leq 0.5$, $0 < b5 \leq 0.45$, $0 < b5 \leq 0.4$, $0 < b5 \leq 0.35$, $0 < b5 \leq 0.3$, or $0 < b5 \leq 0.25$ is satisfied. In Formula 3, for example, $0 < b5 \leq 0.5$, $0 < b5 \leq 0.45$, $0 < b5 \leq 0.4$, $0 < b5 \leq 0.35$, $0 < b5 \leq 0.3$, or $0 < b5 \leq 0.25$ is satisfied. In Formula 3, for example, $0 < b7 \leq 0.095$, $0 < b7 \leq 0.090$, $0 < b7 \leq 0.085$, $0 < b7 \leq 0.080$, or $0 < b7 \leq 0.075$ is satisfied.

Since the garnet-type oxide includes five or more kinds of elements including Zr, M5, M6, M7, and M8, or four kinds of elements including Zr, M5, M6, and M8 at a specific site in the crystal structure thereof, the configuration entropy of a crystalline phase including the substitution may increase to stabilize the crystalline phase, thereby increasing the ion conductivity of the oxide and improving the lithium reduction stability of the oxide. Such a crystalline phase may be, for example, a cubic phase.

In Formula 3, the five or more kinds of elements including Zr, M5, M6, M7, and M8, or the four kinds of elements including Zr, M5, M6, and M8, may have the following combinations:

four kinds of tetravalent cations (combination 1);

a combination of two kinds of tetravalent cations, one kind of trivalent cation and one kind of pentavalent cation (combination 2);

a combination of two kinds of tetravalent cations, one kind of divalent cation and one kind of hexavalent cation (combination 3);

a combination of three kinds of tetravalent cations, one kind of trivalent cation and one kind of pentavalent cation (combination 4);

a combination of three kinds of tetravalent cations, one kind of divalent cation and one kind of hexavalent cation (combination 5);

a combination of two kind of tetravalent cation, one kind of trivalent cations and two kinds of pentavalent cations (combination 6);

a combination of four kinds of tetravalent cations, one kind of trivalent cation and one kind of pentavalent cation (combination 7);

a combination of four kinds of tetravalent ions, one kind of divalent cation and one kind of hexavalent cation (combination 8);

a combination of two kinds of tetravalent cations, two kinds of trivalent cations and two kinds of pentavalent cations (combination 9);

a combination of two kinds of tetravalent cations, two kinds of divalent cations and two kinds of hexavalent cations (combination 10); or five kinds of tetravalent cations (combination 11).

The combination 1 is, for example, Zr/Hf/Sn/Ru, Zr/Hf/Sn/Mo, Zr/Hf/Sn/Ir, Zr/Hf/Sn/Pd, Zr/Hf/Ru/Ir, Zr/Hf/Ru/Mo, Zr/Hf/Ru/Pd, Zr/Hf/Ir/Mo, Zr/Hf/Ir/Pd, Zr/Hf/Mo/Mn, or a combination thereof. The combination 2 is, for example, Zr/Ir/In/Nb, Zr/Ir/In/Ta, Zr/Ir/In/Sb, Zr/Ir/Sc/Nb, Zr/Ir/Sc/Ta, Zr/Ir/Sc/Sb, Zr/Ir/Cr/Nb, Zr/Ir/Cr/Ta, Zr/Ir/Cr/Sb, Zr/Ru/In/Nb, Zr/Ru/In/Ta, Zr/Ru/In/Sb, Zr/Ru/Sc/Nb, Zr/Ru/Sc/Ta, Zr/Ru/Sc/Sb, Zr/Ru/Cr/Nb, Zr/Ru/Cr/Ta, Zr/Ru/Cr/Sb, Zr/Sn/In/Nb, Zr/Sn/In/Ta, Zr/Sn/In/Sb, Zr/Sn/Sc/Nb, Zr/Sn/Sc/Ta, Zr/Sn/Sc/Sb, Zr/Sn/Cr/Nb, Zr/Sn/Cr/Ta, Zr/Sn/Cr/Sb, or a combination thereof. The combination 3 is, for example, Zr/Ir/Ni/Ru, Zr/Ir/Ni/Mo, Zr/Ir/Cu/Ru, Zr/Ir/Cu/Mo, Zr/Ir/Mg/Ru, Zr/Ir/Mg/Mo, Zr/Mn/Ni/Ru, Zr/Mn/Ni/Mo, Zr/Mn/Cu/Ru, Zr/Mn/Cu/Mo, Zr/Mn/Mg/Ru, Zr/Ru/Mg/Mo, Zr/Sn/Ni/Ru, Zr/Sn/Ni/Mo, Zr/Sn/Cu/Ru, Zr/Sn/Cu/Mo, Zr/Sn/Mg/Ru, Zr/Sn/Mg/Mo, or a combination thereof. The combination 4 is, for example, Zr/Hf/Sn/In/Nb, Zr/Hf/Sn/In/Ta, Zr/Hf/Sn/In/Sb, Zr/Hf/Sn/Sc/Nb, Zr/Hf/Sn/Sc/Ta, Zr/Hf/Sn/Sc/Sb, Zr/Hf/Sn/Cr/Nb, Zr/Hf/Sn/Cr/Ta, Zr/Hf/Sn/Cr/Sb, Zr/Hf/Ru/In/Nb, Zr/Hf/Ru/In/Ta, Zr/Hf/Ru/In/Sb, Zr/Hf/Ru/Sc/Nb, Zr/Hf/Ru/Sc/Ta, Zr/Hf/Ru/Sc/Sb, Zr/Hf/Ru/Cr/Nb, Zr/Hf/Ru/Cr/Ta, Zr/Hf/Ru/Cr/Sb, Zr/Mo/Sn/In/Nb, Zr/Mo/Sn/In/Ta, Zr/Mo/Sn/In/Sb, Zr/Mo/Sn/Sc/Nb, Zr/Mo/Sn/Sc/Ta, Zr/Mo/Sn/Sc/Sb, Zr/Mo/Sn/Cr/Nb, Zr/Mo/Sn/Cr/Ta, Zr/Mo/Sn/Cr/Sb, or a combination thereof. The combination 5 is, for example, Zr/Hf/Sn/Ni/Ru, Zr/Hf/Sn/Ni/Mo, Zr/Hf/Sn/Cu/Ru, Zr/Hf/Sn/Cu/Mo, Zr/Hf/Sn/Mg/Ru, Zr/Hf/Sn/Mg/Mo, Zr/Hf/Ir/Ni/Ru, Zr/Hf/Ir/Ni/Mo, Zr/Hf/Ir/Cu/Ru, Zr/Hf/Ir/Cu/Mo, Zr/Hf/Ir/Mg/Ru, Zr/Hf/Ir/Mg/Mo, or a combination thereof. The combination 6 is, for example, Zr/Ir/Sc/Nb/Ta, Zr/Ir/Sc/Nb/Sb, Zr/Ir/Sc/Ta/Sb, Zr/Ir/Cr/Nb/Ta, Zr/Ir/Cr/Nb/Sb, Zr/Ir/Cr/Ta/Sb, Zr/Ir/In/Nb/Ta, Zr/Ir/In/Nb/Sb, Zr/Ir/In/Ta/Sb, Zr/Ru/In/Nb/Ta, Zr/Sn/In/Nb/Sb, Zr/Sn/In/Ta/Sb, Zr/Ru/Cr/Nb/Ta, Zr/Ru/Cr/Nb/Sb, Zr/Ru/Cr/Ta/Sb, Zr/Ru/Sc/Nb/Ta, Zr/Mn/Sc/Nb/Sb, Zr/Mn/Sc/Ta/Sb, Zr/Sn/In/Nb/Ta, Zr/Sn/In/Nb/Sb, Zr/Sn/In/Ta/Sb, Zr/Sn/Cr/Nb/Ta, Zr/Sn/Cr/Nb/Sb, Zr/Sn/Cr/Ta/Sb, Zr/Sn/Sc/Nb/Ta, Zr/Sn/Sc/Nb/Sb, Zr/Sn/Sc/Ta/Sb, or a combination thereof. The combination 7 is, for example, Zr/Hf/Sn/Ru/In/Nb, Zr/Hf/Sn/Ru/In/Ta, Zr/Hf/Sn/Ru/In/Sb, Zr/Hf/Sn/Ru/Sc/Nb, Zr/Hf/Sn/Ru/Sc/Ta, Zr/Hf/Sn/Ru/Sc/Sb, Zr/Hf/Sn/Ru/Cr/Nb, Zr/Hf/Sn/Ru/Cr/Ta, Zr/Hf/Sn/Ru/Cr/Sb, Zr/Hf/Sn/Mo/In/Nb, Zr/Hf/Sn/Mo/In/Ta, Zr/Hf/Sn/Mo/In/Sb, Zr/Hf/Sn/Mo/Sc/Nb, Zr/Hf/Sn/Mo/Sc/Ta, Zr/Hf/Sn/Mo/Sc/Sb, Zr/Hf/Sn/Mo/Cr/Nb, Zr/Hf/Sn/Mo/Cr/Ta, Zr/Hf/Sn/Mo/Cr/Sb, or a combination thereof. The combination 8 is, for example, Zr/Hf/Sn/Mn/Ni/Ru, Zr/Hf/Sn/Mn/Ni/Mo, Zr/Hf/Sn/Mn/Cu/Ru, Zr/Hf/Sn/Mn/Cu/Mo, Zr/Hf/Sn/Mn/Mg/Ru, Zr/Hf/Sn/Mn/Mg/Mo, Zr/Hf/Sn/Pd/Ni/Ru, Zr/Hf/Sn/Pd/Ni/Mo, Zr/Hf/Sn/Pd/Cu/Ru, Zr/Hf/Sn/Pd/Cu/Mo, Zr/Hf/Sn/Pd/Mg/Ru, Zr/Hf/Sn/Pd/Mg/Mo, or a combination thereof. The combination 9 is, for example, Zr/Ir/In/Sc/Nb/Ta, Zr/Ir/In/Sc/Nb/Sb, Zr/Ir/In/Sc/Ta/Sb, Zr/Ir/In/Cr/Nb/Ta, Zr/Ir/In/Cr/Nb/Sb, Zr/Ir/In/Cr/Ta/Sb, Zr/Ir/Cr/Sc/Nb/Ta, Zr/Ir/Cr/Sc/Nb/Sb, Zr/Ir/Cr/Sc/Ta/Sb, or a combination thereof. The combination 10 is, for example, Zr/Ir/Cu/Ni/Ru/Mo, Zr/Sn/Cu/Ni/Ru/Mo, Zr/Mn/Cu/Ni/Ru/Mo, Zr/Ir/Mg/Ni/Ru/Mo, Zr/Sn/Mg/Ni/Ru/Mo, Zr/Mn/Mg/Ni/Ru/Mo, Zr/Ir/Ca/Ni/Ru/Mo, Zr/Mn/Ca/Ni/Ru/Mo, Zr/Sn/Ca/Ni/Ru/Mo, or a combination thereof. The combination 11 is, for example, Zr/Hf/Sc/Ta/Ru, Zr/Hf/Sc/Ta/Mn, Zr/Hf/Sc/Ta/Ir, Zr/Hf/Sc/Ta/Sn, Zr/Hf/Cr/Ta/Ru, Zr/Hf/Sc/Ta/Mn, Zr/Hf/Sc/Ta/Ir, Zr/Hf/Sc/Ta/Sn, or a combination thereof.

In the case of five kinds of elements, the molar ratio of the four kinds of elements may be 4:4:4:0.1~1.1, 3:5:3:0.1~1.1, 5:3:5:0.1~1.1, 3:5:4:0.1~1.1, or 5:3:4:0.1~1.1. In the case of four kinds of elements, the molar ratio of the five kinds of elements may be 5:5:5:5:0.1~1.1, 4:6:4:6:0.1~1.1, 6:4:6:4:0.1~1.1, 4:4:6:6:0.1~1.1, 6:6:4:4:0.1~1.1, 3:3:7:7:0.1~1.1, 7:7:3:3:0.1~1.1, 8:2:8:2:0.1~1.1, 7:3:7:3:0.1~1.1, 8:8:2:2:0.1~1.1, or 2:2:8:8:0.1~1.1. In the case of five kinds of elements, the molar ratio of the six kinds of elements may be 4:4:4:4:4:0.1~1.1, 3:5:3:5:4:0.1~1.1, 5:3:5:3:4:0.1~1.1, 3:5:4:3:5:0.1~1.1, or 5:3:4:5:3:0.1~1.1.

In the solid ion conductor, for example, the garnet-type oxide represented by Formula 1 may be a garnet-type oxide represented by Formula 4:

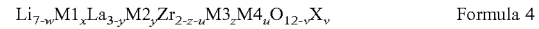

$$Li_{7-w}M1_xLa_{3-y}M2_yZr_{2-z-u}M3_zM4_uO_{12-v}X_v \qquad \text{Formula 4}$$

wherein, in Formula 4,

M1 is H, Fe, Ga, Al, B, Be or a combination thereof,

M2 is Ba, Ca, Sr, Y, Bi, Pr, Nd, Ac, Sm, Gd or a combination thereof,

M3 is Al, Ga, Ta, Nb, Hf, Ti, V, Cr, Co, Ni, Cu, Mo, W, Mg, Tc, Ru, Pd, Sc, Cd, In, Sb, Te, Tl, Pt, Si, or a combination thereof, M4 is Ir, Ru, Mn, Sn or a combination thereof, X is a monovalent anion, a divalent anion, a trivalent anion, or a combination thereof, $0 \leq x \leq 2$, $0 \leq y \leq 0.2$, $0 < z < 2$, $0 < u \leq 0.2$, $0 < v < 2$, $0 < z+u < 2$, and $w=[a \times x]+[(b-3) \times y]+[(c-4) \times z]+[(d-4) \times u]+[(e+2) \times v]$ are satisfied, and a is an oxidation number of M1, b is an oxidation number of M2, c is an oxidation number of M3, d is an oxidation number of M4, and e is an oxidation number of X. In Formula 4, z is, for example, more than 0 and 1.5 or less, more than 0 and 1.0 or less, or more than 0 and 0.5 or less. z is, for example, 0.5. In Formula 4, u is, for example, more than 0 and 0.2 or less, more than 0 and 0.18 or less, more than 0 and 0.15 or less, more than 0 and 0.12 or less, more than 0 and 0.10 or less, more than 0 and 0.08 or less, or more than 0 and 0.05 or less. In Formula 4, for example, 0<z+u<1.5, 0<z+u<1.0, 0<z+u<0.8, 0<z+u<0.6, 0<z+u<0.5, or 0<z+u<0.4 is satisfied.

In the solid ion conductor, for example, the garnet-type oxide represented by Formula 1 may be a garnet-type oxide represented by Formula 5:

$$Li_{7-w}M1_xLa_{3-y}M2_yZr_{2-p-q-r-s}M5_pM6_qM7_rM8_sO_{12-v}X_v \quad \text{Formula 5}$$

wherein, in Formula 5,
M1 is H, Fe, Ga, Al, B, Be or a combination thereof,
M2 is Ba, Ca, Sr, Y, Bi, Pr, Nd, Ac, Sm, Gd or a combination thereof,
M5, M6, and M7 are each independently Al, Ga, Ta, Nb, Hf, Ti, V, Cr, Co, Ni, Cu, Mo, W, Mg, Tc, Ru, Pd, Sc, Cd, In, Sb, Te, Tl, Pt, Si, or a combination thereof,
M8 is Ir, Ru, Mn, Sn or a combination thereof,
X is a monovalent anion, a divalent anion, a trivalent anion, or a combination thereof,
$0 \le x \le 2$, $0 \le y \le 0.2$, $0 < p < 2$, $0 < q < 2$, $0 \le r < 2$, $0 < s \le 0.2$, $0 < v < 2$, $0 < p+q+r+s < 2$, and $w=[a \times x]+[(b-3) \times y]+[(f-4) \times p]+[(g-4) \times q]+[(h-4) \times r]+[(i-4) \times s]+[(e+2) \times v]$ are satisfied, and
a is an oxidation number of M1, b is an oxidation number of M2, f is an oxidation number of M5, g is an oxidation number of M6, h is an oxidation number of M7, i is an oxidation number of M8, and e is an oxidation number of X.

In Formula 5, p, q, and r are each independently, for example, more than 0 and 1.0 or less, more than 0 and 0.9 or less, more than 0 and 0.8 or less, more than 0 and 0.7 or less, more than 0 and 0.6 or less, more than 0 and 0.5 or less, more than 0 and 0.4 or less, more than 0 and 0.3 or less, or more than 0 and 0.2 or less. p is, for example, 0.4 to 0.5. In Formula 5, s is, for example, more than 0 and 0.2 or less, more than 0 and 0.18 or less, more than 0 and 0.15 or less, more than 0 and 0.12 or less, more than 0 and 0.10 or less, more than 0 and 0.08 or less, or more than 0 and 0.05 or less. In Formula 5, for example, 0<p+q+r+s<1.9, 0<p+q+r+s<1.8, 0<p+q+r+s<1.7, 0<p+q+r+s<1.6, 0<p+q+r+s<1.5, 0<p+q+r+s<1.0, or 0<p+q+r+s<0.5 is satisfied.

In the solid ion conductor, for example, in Formulas 1 to 5, X may be iodine (I), chlorine (Cl), bromine (Br), fluorine (F), cyanide, cyanate, thiocyanate, azide ($N3^-$), or a combination thereof. In Formulas 1 to 5, for example, X may be I, Cl, Br, or F. In Formulas 1 to 5, for example, X may be F.

In the solid ion conductor, for example, the garnet-type oxide represented by Formula 1 may be a garnet-type oxide represented by Formula 6:

$$Li_{7-w}La_3Zr_{2-z-u}M9_zM10_uO_{12} \quad \text{Formula 6}$$

wherein, in Formula 6,
M9 is Al, Ga, Ta, Nb, Hf, Ti, V, Cr, Co, Ni, Cu, Mo, W, Mg, Tc, Ru, Pd, Sc, Cd, In, Sb, Te, Tl, Pt, Si, or a combination thereof,
M10 is Ir, Ru, Mn, Sn, or a combination thereof,
c is an oxidation number of M9 and d is an oxidation number of M10, and $0 < z < 2$, $0 < u \le 0.2$, $0 < z+u < 2$, and $w=[(c-4) \times z]+[(d-4) \times u]$ are satisfied. In Formula 6, for example, M9 may be Al, Ga, Ta, Nb, or a combination thereof, and M10 may be Ir, Ru, or a combination thereof. In Formula 6, z is, for example, more than 0 and 1.5 or less, more than 0 and 1.0 or less, or more than 0 and 0.5 or less. In Formula 6, u is, for example, more than 0 and 0.2 or less, more than 0 and 0.18 or less, more than 0 and 0.15 or less, more than 0 and 0.12 or less, more than 0 and 0.10 or less, more than 0 and 0.08 or less, or more than 0 and 0.05 or less. In Formula 6, for example, 0<z+u<1.5, 0<z+u<1.0, 0<z+u<0.8, 0<z+u<0.6, 0<z+u<0.5, or 0<z+u<0.4 is satisfied.

In the solid ion conductor, for example, the garnet-type oxide represented by Formula 1 may be a garnet-type oxide represented by Formula 7:

$$Li_{7-w}La_3Zr_{2-p-q-r-s}M11_pM12_qM13_rM14_sO_{12} \quad \text{Formula 7}$$

wherein, in Formula 7,
M11, M12, and M13 are each independently Al, Ga, Ta, Nb, Hf, Ti, V, Cr, Co, Ni, Cu, Mo, W, Mg, Tc, Ru, Pd, Sc, Cd, In, Sb, Te, Tl, Pt, Si, or a combination thereof,
M14 is Ir, Ru, Mn, Sn, or a combination thereof,
f is an oxidation number of M11, g is an oxidation number of M12, h is an oxidation number of M13, and i is an oxidation number of M14, and $0 < p < 2$, $0 < q < 2$, $0 \le r < 2$, $0 < s \le 0.2$, $0 < p+q+r+s < 2$, and $w=[(f-4) \times p]+[(g-4) \times q]+[(h-4) \times r]+[(i-4) \times s]$ are satisfied. In Formula 7, for example, M11 is Al, Ga, Ta, Nb, or a combination thereof, M12 and M13 are each independently Hf, Sc, In, or a combination thereof, and M14 is Ir, Ru, Sn, or a combination thereof. In Formula 7, p, q, and r are each independently, for example, more than 0 and 1.0 or less, more than 0 and 0.9 or less, more than 0 and 0.8 or less, more than 0 and 0.7 or less, more than 0 and 0.6 or less, more than 0 and 0.5 or less, more than 0 and 0.4 or less, more than 0 and 0.3 or less, or more than 0 and 0.2 or less. In Formula 7, s is, for example, more than 0 and 0.2 or less, more than 0 and 0.18 or less, more than 0 and 0.15 or less, more than 0 and 0.12 or less, more than 0 and 0.10 or less, more than 0 and 0.08 or less, or more than 0 and 0.05 or less. In Formula 7, for example, 0<p+q+r+s<1.9, 0<p+q+r+s<1.8, 0<p+q+r+s<1.7, 0<p+q+r+s<1.6, 0<p+q+r+s<1.5, 0<p+q+r+s<1.0, or 0<p+q+r+s<0.5 is satisfied.

In the solid ion conductor, for example, the garnet-type oxide represented by Formula 1 may be a garnet-type oxide represented by any one of Formulas:

$Li_{7-w}La_3Zr_{2-z-u}Al_zIr_uO_{12}$ ($6 \le 7-w \le 8$, $0 < z \le 1$, $0 < u \le 0.2$), $Li_{7-w}La_3Zr_{2-z-u}Al_zRu_uO_{12}$ ($6 \le 7-w \le 8$, $0 < z \le 1$, $0 < u \le 0.2$), $Li_{7-w}La_3Zr_{2-z-u}Al_zMn_uO_{12}$ ($6 \le 7-w \le 8$, $0 < z \le 1$, $0 < u \le 0.2$), $Li_{7-w}La_3Zr_{2-z-u}Al_zSn_uO_{12}$ ($6 \le 7-w \le 8$, $0 < z \le 1$, $0 < u \le 0.2$);

$Li_{7-w}La_3Zr_{2-z-u}Ga_zIr_uO_{12}$ ($6 \le 7-w \le 8$, $0 < z \le 1$, $0 < u \le 0.2$), $Li_{7-w}La_3Zr_{2-z-u}Ga_zRu_uO_{12}$ ($6 \le 7-w \le 8$, $0 < z \le 1$, $0 < u \le 0.2$), $Li_{7-w}La_3Zr_{2-z-u}Ga_zMn_uO_{12}$ ($6 \le 7-w \le 8$, $0 < z \le 1$, $0 < u \le 0.2$), $Li_{7-w}La_3Zr_{2-z-u}Ga_zSn_uO_{12}$ ($6 \le 7-w \le 8$, $0 < z \le 1$, $0 < u \le 0.2$);

$Li_{7-w}La_3Zr_{2-z-u}Ta_zIr_uO_{12}$ ($6 \le 7-w \le 8$, $0 < z \le 1$, $0 < u \le 0.2$), $Li_{7-w}La_3Zr_{2-z-u}Ta_zRu_uO_{12}$ ($6 \le 7-w \le 8$, $0 < z \le 1$, $0 < u \le 0.2$), $Li_{7-w}La_3Zr_{2-z-u}Ta_zMn_uO_{12}$ ($6 \le 7-w \le 8$, $0 < z \le 1$, $0 < u \le 0.2$), $Li_{7-w}La_3Zr_{2-z-u}Ta_zSn_uO_{12}$ ($6 \le 7-w \le 8$, $0 < z \le 1$, $0 < u \le 0.2$);

$Li_{7-w}La_3Zr_{2-z-u}Nb_zIr_uO_{12}$ ($6 \le 7-w \le 8$, $0 < z \le 1$, $0 < u \le 0.2$), $Li_{7-w}La_3Zr_{2-z-u}Nb_zRu_uO_{12}$ ($6 \le 7-w \le 8$, $0 < z \le 1$, $0 < u \le 0.2$), $Li_{7-w}La_3Zr_{2-z-u}Nb_zMn_uO_{12}$ ($6 \le 7-w \le 8$, $0 < z \le 1$, $0 < u \le 0.2$), $Li_{7-w}La_3Zr_{2-z-u}Nb_zSn_uO_{12}$ ($6 \le 7-w \le 8$, $0 < z \le 1$, $0 < u \le 0.2$);

$Li_{7-w}La_3Zr_{2-p-q-r-s}Al_pHf_qSc_rIr_sO_{12}$ ($6 \le 7-w \le 8$, $0 < p \le 1$, $0 < q \le 1$, $0 < r \le 1$, $0 < s \le 0.2$, $0 < p+q+r+s < 2$), $Li_{7-w}La_3Zr_{2-p-q-r-s}Al_pHf_qSc_rRu_sO_{12}$ ($6 \le 7-w \le 8$, $0 < p \le 1$, $0 < q \le 1$, $0 < r \le 1$, $0 < s \le 0.2$, $0 < p+q+r+s < 2$), $Li_{7-w}La_3Zr_{2-p-q-r-s}Al_pHf_qSc_rMn_sO_{12}$ ($6 \le 7-w \le 8$, $0 < p \le 1$, $0 < q \le 1$, $0 < r \le 1$, $0 < s \le 0.2$, $0 < p+q+r+s < 2$), $Li_{7-w}La_3Zr_{2-p-q-r-s}Al_pHf_qSc_rSn_sO_{12}$ ($6 < 7-w \le 8$, $0 < p \le 1$, $0 < q \le 1$, $0 < r \le 1$, $0 < s \le 0.2$, $0 < p+q+r+s < 2$);

$Li_{7-w}La_3Zr_{2-p-q-r-s}Ga_pHf_qSc_rIr_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Ga_pHf_qSc_rRu_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Ga_pHf_qSc_rMn_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Ga_pHf_qSc_rSn_sO_{12}$ ($6<7-w \leq 8$, $0<p \leq 1$, $0<q \leq 1$, $0<r \leq 1$, $0<s \leq 0.2$, $0<p+q+r+s<2$);

$Li_{7-w}La_3Zr_{2-p-q-r-s}Ta_pHf_qSc_rIr_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Ta_pHf_qSc_rRu_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Ta_pHf_qSc_rMn_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Ta_pHf_qSc_rSn_sO_{12}$ ($6<7-w \leq 8$, $0<p \leq 1$, $0<q \leq 1$, $0<r \leq 1$, $0<s \leq 0.2$, $0<p+q+r+s<2$);

$Li_{7-w}La_3Zr_{2-p-q-r-s}Nb_pHf_qSc_rIr_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Nb_pHf_qSc_rRu_sO_{12}$ ($6 \leq 7-w \leq 8$, $0<p \leq 1$, $0<q \leq 1$, $0<r \leq 1$, $0<s \leq 0.2$, $0<p+q+r+s<2$), $Li_{7-w}La_3Zr_{2-p-q-r-s}Nb_pHf_qSc_rMn_sO_{12}$ ($6 \leq 7-w \leq 8$, $0<p \leq 1$, $0<q \leq 1$, $0<r \leq 1$, $0<s \leq 0.2$, $0<p+q+r+s<2$), or $Li_{7-w}La_3Zr_{2-p-q-r-s}Nb_pHf_qSc_rSn_sO_{12}$ ($6 \leq 7-w \leq 8$, $0<p<1$, $0<q \leq 1$, $0<r \leq 1$, $0<s \leq 0.2$, $0<p+q+r+s<2$).

In the solid ion conductor, for example, the garnet-type oxide represented by Formula 1 may be a garnet-type oxide represented by any one of Formulas:

$Li_{7.5}La_3Zr_{1.4}Al_{0.5}Ir_{0.1}O_{12}$, $Li_{7.5}La_3Zr_{1.3}Al_{0.5}Ir_{0.2}O_{12}$, $Li_{7.5}La_3Zr_{1.4}Ga_{0.5}Ir_{0.1}O_{12}$, $Li_{7.5}La_3Zr_{1.3}Ga_{0.5}Ir_{0.2}O_{12}$, $Li_{6.5}La_3Zr_{1.4}Ta_{0.5}Ir_{0.1}O_{12}$, $Li_{6.5}La_3Zr_{1.3}Ta_{0.5}Ir_{0.2}O_{12}$, $Li_{6.5}La_3Zr_{1.4}Nb_{0.5}Ir_{0.1}O_{12}$, $Li_{6.5}La_3Zr_{1.3}Nb_{0.5}Ir_{0.2}O_{12}$;

$Li_{7.5}La_3Zr_{1.4}Al_{0.5}Ru_{0.1}O_{12}$, $Li_{7.5}La_3Zr_{1.3}Al_{0.5}Ru_{0.2}O_{12}$, $Li_{7.5}La_3Zr_{1.4}Ga_{0.5}Ru_{0.1}O_{12}$, $Li_{7.5}La_3Zr_{1.3}Ga_{0.5}Ru_{0.2}O_{12}$, $Li_{6.5}La_3Zr_{1.4}Ta_{0.5}Ru_{0.1}O_{12}$, $Li_{6.5}La_3Zr_{1.3}Ta_{0.5}Ru_{0.2}O_{12}$, $Li_{6.5}La_3Zr_{1.4}Nb_{0.5}Ru_{0.1}O_{12}$, $Li_{6.5}La_3Zr_{1.3}Nb_{0.5}Ru_{0.2}O_{12}$;

$Li_{7.5}La_3Zr_{1.4}Al_{0.5}Mn_{0.1}O_{12}$, $Li_{7.5}La_3Zr_{1.3}Al_{0.5}Mn_{0.2}O_{12}$, $Li_{7.5}La_3Zr_{1.4}Ga_{0.5}Mn_{0.1}O_{12}$, $Li_{7.5}La_3Zr_{1.3}Ga_{0.5}Mn_{0.2}O_{12}$, $Li_{6.5}La_3Zr_{1.4}Ta_{0.5}Mn_{0.1}O_{12}$, $Li_{6.5}La_3Zr_{1.3}Ta_{0.5}Mn_{0.2}O_{12}$, $Li_{6.5}La_3Zr_{1.4}Nb_{0.5}Mn_{0.1}O_{12}$, $Li_{6.5}La_3Zr_{1.3}Nb_{0.5}Mn_{0.2}O_{12}$;

$Li_{7.5}La_3Zr_{1.4}Al_{0.5}Sn_{0.1}O_{12}$, $Li_{7.5}La_3Zr_{1.3}Al_{0.5}Sn_{0.2}O_{12}$, $Li_{7.5}La_3Zr_{1.4}Ga_{0.5}Sn_{0.1}O_{12}$, $Li_{7.5}La_3Zr_{1.3}Ga_{0.5}Sn_{0.2}O_{12}$, $Li_{6.5}La_3Zr_{1.4}Ta_{0.5}Sn_{0.1}O_{12}$, $Li_{6.5}La_3Zr_{1.3}Ta_{0.5}Sn_{0.2}O_{12}$, $Li_{6.5}La_3Zr_{1.4}Nb_{0.5}Sn_{0.1}O_{12}$, $Li_{6.5}La_3Zr_{1.3}Nb_{0.5}Sn_{0.2}O_{12}$;

$Li_{7.98}La_3Zr_{0.49}Al_{0.49}Hf_{0.49}Sc_{0.49}Ir_{0.04}O_{12}$, $Li_{7.95}La_3Zr_{0.475}Al_{0.475}Hf_{0.475}Sc_{0.475}Ir_{0.1}O_{12}$, $Li_{7.98}La_3Zr_{0.49}Ga_{0.49}Hf_{0.49}Sc_{0.49}Ir_{0.04}O_{12}$, $Li_{7.95}La_3Zr_{0.475}Ga_{0.475}Hf_{0.475}Sc_{0.475}Ir_{0.1}O_{12}$, $Li_7La_3Zr_{0.49}Ta_{0.49}Hf_{0.49}Sc_{0.49}Ir_{0.04}O_{12}$, $Li_7La_3Zr_{0.475}Ta_{0.475}Hf_{0.475}Sc_{0.475}Ir_{0.1}O_{12}$, $Li_7La_3Zr_{0.49}Nb_{0.49}Hf_{0.49}Sc_{0.49}Ir_{0.04}O_{12}$, $Li_7La_3Zr_{0.475}Nb_{0.475}Hf_{0.475}Sc_{0.475}Ir_{0.1}O_{12}$;

$Li_{7.98}La_3Zr_{0.49}Al_{0.49}Hf_{0.49}Sc_{0.49}Ru_{0.04}O_{12}$, $Li_{7.95}La_3Zr_{0.475}Al_{0.475}Hf_{0.475}Sc_{0.475}Ru_{0.1}O_{12}$, $Li_{7.98}La_3Zr_{0.49}Ga_{0.49}Hf_{0.49}Sc_{0.49}Ru_{0.04}O_{12}$, $Li_{7.95}La_3Zr_{0.475}Ga_{0.475}Hf_{0.475}Sc_{0.475}Ru_{0.1}O_{12}$, $Li_7La_3Zr_{0.49}Ta_{0.49}Hf_{0.49}Sc_{0.49}Ru_{0.04}O_{12}$, $Li_7La_3Zr_{0.475}Ta_{0.475}Hf_{0.475}Sc_{0.475}Ru_{0.1}O_{12}$, $Li_7La_3Zr_{0.49}Nb_{0.49}Hf_{0.49}Sc_{0.49}Ru_{0.04}O_{12}$, $Li_7La_3Zr_{0.475}Nb_{0.475}Hf_{0.475}Sc_{0.475}Ru_{0.1}O_{12}$, $Li_{7.98}La_3Zr_{0.49}Al_{0.49}Hf_{0.49}Sc_{0.49}Mn_{0.04}O_{12}$, $Li_{7.95}La_3Zr_{0.475}Al_{0.475}Hf_{0.475}Sc_{0.475}Mn_{0.1}O_{12}$, $Li_{7.98}La_3Zr_{0.49}Ga_{0.49}Hf_{0.49}Sc_{0.49}Mn_{0.04}O_{12}$, $Li_{7.95}La_3Zr_{0.475}Ga_{0.475}Hf_{0.475}Sc_{0.475}Mn_{0.1}O_{12}$, $Li_7La_3Zr_{0.49}Ta_{0.49}Hf_{0.49}Sc_{0.49}Mn_{0.04}O_{12}$, $Li_7La_3Zr_{0.475}Ta_{0.475}Hf_{0.475}Sc_{0.475}Mn_{0.1}O_{12}$, $Li_7La_3Zr_{0.49}Nb_{0.49}Hf_{0.49}Sc_{0.49}Mn_{0.04}O_{12}$, $Li_7La_3Zr_{0.475}Nb_{0.475}Hf_{0.475}Sc_{0.475}Mn_{0.1}O_{12}$, $Li_{7.98}La_3Zr_{0.49}Al_{0.49}Hf_{0.49}Sc_{0.49}Sn_{0.04}O_{12}$, $Li_{7.95}La_3Zr_{0.475}Al_{0.475}Hf_{0.475}Sc_{0.475}Sn_{0.1}O_{12}$, $Li_{7.98}La_3Zr_{0.49}Ga_{0.49}Hf_{0.49}Sc_{0.49}Sn_{0.04}O_{12}$, $Li_{7.95}La_3Zr_{0.475}Ga_{0.475}Hf_{0.475}Sc_{0.475}Sn_{0.1}O_{12}$, $Li_7La_3Zr_{0.49}Ta_{0.49}Hf_{0.49}Sc_{0.49}Sn_{0.04}O_{12}$, $Li_7La_3Zr_{0.475}Ta_{0.475}Hf_{0.475}Sc_{0.475}Sn_{0.1}O_{12}$, $Li_7La_3Zr_{0.49}Nb_{0.49}Hf_{0.49}Sc_{0.49}Sn_{0.04}O_{12}$, or $Li_7La_3Zr_{0.475}Nb_{0.475}Hf_{0.475}Sc_{0.475}Sn_{0.1}O_{12}$.

The garnet-type oxide represented by Formula 1 includes, for example, a cubic phase, and has a garnet or garnet-like crystal structure. While not wanting to be bound by theory, it is understood that since the garnet-type oxide includes a cubic phase, it has excellent ion conductivity and exhibits lithium reduction stability.

The solid ion conductor including the garnet-type oxide represented by Formula 1 provides excellent lithium ion conductivity. The solid ion conductor including the garnet-type oxide represented by Formula 1 provides an ion conductivity of about $1 \times 10^{-4}$ S/cm or more, about $1.5 \times 10^{-4}$ S/cm or more, about $2 \times 10^{-4}$ S/cm or more, about $2.5 \times 10^{-4}$ S/cm or more, about $3 \times 10^{-4}$ S/cm or more, or about $3.5 \times 10^{-4}$ S/cm or more, at room temperature, for example, at about 25° C. The solid ion conductor including the garnet-type oxide represented by Formula 1 provides an ion conductivity of about $1 \times 10^{-4}$ S/cm to about $1 \times 10^{-2}$ S/cm, about $1 \times 10^{-4}$ S/cm to about $1 \times 10^{-3}$ S/cm, about $1.5 \times 10^{-4}$ S/cm to about $1 \times 10^{-3}$ S/cm, about $2 \times 10^{-4}$ S/cm to about $1 \times 10^{-3}$ S/cm, about $2.5 \times 10^{-4}$ S/cm to about $1 \times 10^{-3}$ S/cm, about $3 \times 10^{-4}$ S/cm to about $1 \times 10^{-3}$ S/cm, or about $3.5 \times 10^{-4}$ S/cm to about $1 \times 10^{-3}$ S/cm, at room temperature, for example, at about 27° C. The ionic conductivity of the solid ion conductor can be measured by electrochemical impedance spectroscopy (EIS). See, for example, J.-M. Winand et al., "Measurement of Ionic Conductivity in Solid Electrolytes," Europhysics Letters, vol. 8, no. 5, p. 447-452, 1989, the content of which is included herein by reference.

The solid ion conductor including the garnet-type oxide represented by Formula 1 provides reduced electron conductivity. The solid ion conductor including the garnet-type oxide represented by Formula 1 provides an electron conductivity of about $1 \times 10^{-5}$ mS/cm or less, about $0.5 \times 10^{-5}$ mS/cm or less, about $0.3 \times 10^{-5}$ mS/cm or less, about $0.2 \times 10^{-5}$ mS/cm or less, about $0.1 \times 10^{-5}$ mS/cm or less, about $0.05 \times 10^{-5}$ mS/cm or less, or about $0.01 \times 10^{-5}$ mS/cm or less, at room temperature, for example, at about 300 K, that is, about 27° C. Accordingly, in an electrode assembly including a cathode, an anode, and the solid ion conductor including the garnet-type oxide represented by Formula 1 and disposed between the cathode and the anode, electron transfer between the cathode and the anode may be effectively blocked to reduce the possibility of a short-circuit between the cathode and the anode. The electron conductivity of the solid ion conductor may be measured by electrochemical impedance spectroscopy (EIS).

The activation energy of the solid ion conductor including the garnet-type oxide represented by Formula 1 in a temperature range of about 25° C. to about 100° C. may be about 0.5 electronvolt (eV) or less, about 0.45 eV or less, or about 0.4 eV or less. The activation energy of the solid ion conductor including the garnet-type oxide represented by Formula 1 in a temperature range of about 25° C. to about 100° C. may be about 0.30 eV to about 0.4 eV, about 0.31 eV to about 0.4 eV, about 0.32 eV to about 0.4 eV, about 0.33 eV to about 0.4 eV, about 0.34 eV to about 0.4 eV, or about 0.35 eV to about 0.4 eV. The activation energy of the solid ion conductor may be measured by electrochemical impedance spectroscopy (EIS).

The solid ion conductor including the garnet-type oxide represented by Formula 1 may include a major resonance (i.e., peak) appearing at about 600 cm$^{-1}$ to about 800 cm$^{-1}$ in a Raman spectrum. This peak may be a peak due to a bond between oxygen and a metal such as Ir, Ru, Mn, or Sn that is present on the surface of the solid ion conductor. Since the solid ion conductor including the garnet-type oxide represented by Formula 1 includes a strong peak due to an Ir—O bond, a Ru—O bond, a Mn—O bond, a Sn—O bond, or the like on the surface thereof, the interfacial resistance between the solid ion conductor represented by Formula 1 and lithium metal may be reduced. For example, without wishing to be bound by theory, it is believed that since the solid ion conductor including the garnet-type oxide represented by Formula 1 has an Ir—O bond, a Ru—O bond, a Mn—O bond, a Sn—O bond, or the like on the surface thereof in high content, this solid ion conductor may act as a catalyst for an electrode reaction. Alternatively, without wishing to be bound by theory, it is believed that the affinity between the solid ion conductor including the garnet-type oxide represented by Formula 1 and lithium may increase, and as a result, the interface resistance to the lithium metal may decrease. Therefore, the internal resistance of a secondary battery including a solid ion conductor as described in this disclosure may be reduced, and the charge-discharge characteristics of the secondary battery may be improved.

The interfacial resistance between the solid ion conductor and a lithium metal, when determined by impedance spectroscopy in a lithium symmetric cell disposed between the lithium metal electrodes at a temperature of 25° C. and in a frequency range of about 0.1 hertz (Hz) to about 10$^6$ Hz, may be, for example, about 1 ohm square centimeter (Ω·cm$^2$) to about 80 Ω·cm$^2$, about 1 Ω·cm$^2$ to about 75 Ω·cm$^2$, about 1 Ω·cm$^2$ to about 70 Ω·cm$^2$, about 1 Ω·cm$^2$ to about 65 Ω·cm$^2$, about 1 Ω·cm$^2$ to about 60 Ω·cm$^2$, about 1 Ω·cm$^2$ to about 55 Ω·cm$^2$, about 1 Ω·cm$^2$ to about 50 Ω·cm$^2$, about 1 Ω·cm$^2$ to about 45 Ω·cm$^2$, or about 1 Ω·cm$^2$ to about 40 Ω·cm$^2$. Since the solid ion conductor has such low interfacial resistance, the charge-discharge characteristics of a secondary battery including the solid ion conductor are further improved.

The garnet-type oxide represented by Formula 1 may be in the form of particles. The average particle diameter of the particles is, for example, about 5 nanometer (nm) to about 500 micrometer (μm), about 100 nm to about 100 μm, or about 1 μm to about 50 μm, and the specific surface area thereof is, for example, about 0.01 square meter per gram (m$^2$/g) to about 1000 m$^2$/g, or about 0.5 m$^2$/g to about 100 m$^2$/g. The average particle diameter of the garnet-type oxide represented by Formula 1 is, for example, a median diameter (D50) measured using a laser particle size distribution meter.

Solid Electrolyte

A solid electrolyte according to another embodiment includes the solid ion conductor including the garnet-type oxide represented by Formula 1. The solid electrolyte may have high ion conductivity and low interfacial resistance by including such a solid ion conductor. Accordingly, the solid electrolyte including the solid ion conductor including the garnet-type oxide represented by Formula 1 may be used as an electrolyte for an electrochemical device.

The solid electrolyte may include a second solid electrolyte in addition to the solid ion conductor including the garnet-type oxide represented by Formula 1. For example, the solid electrolyte may additionally include a sulfide-based solid electrolyte and/or an oxide-based solid electrolyte. Examples may include, but are not limited to, Li$_3$N, a lithium super ionic conductor (LISICON), LIPON (Li$_{3-y}$PO$_{4-x}$N$_x$, 0<y<3, 0<x<4), thio-LISICON (Li$_{3.25}$Ge$_{0.25}$P$_{0.75}$S$_4$), Li$_2$S, Li$_2$S—P$_2$S$_5$, Li$_2$S—SiS$_2$, Li$_2$S—GeS$_2$, Li$_2$S—B$_2$S$_5$, Li$_2$S—Al$_2$S$_5$, Li$_2$O—Al$_2$O$_3$—TiO$_2$—P$_2$O$_5$(LATP), or a crystalline argyrodite type solid ion conductor. Any suitable solid ion conductor may be used.

The crystalline argyrodite type solid ion conductor is, for example, a solid ion conductor having a composition represented by Formula 8 and having suitable crystallinity. The crystalline argyrodite type solid ion conductor may be obtained by heat treatment at a high temperature of 550° C. or more.

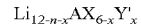   Formula 8

In Formula 8,

A is P, As, Ge, Ga, Sb, Si, Sn, Al, In, Ti, V, Nb or Ta,

X is S, Se, Te, or a combination thereof,

Y' is Cl, Br, I, F, CN, OCN, SCN, N$_3$, or a combination thereof, and

0≤x≤2 is satisfied. n is an oxidation number of A, the oxidation number of X is −2, and the oxidation number of Y' is −1.

The argyrodite type solid ion conductor includes Li$_{7-x}$PS$_{6-x}$Cl$_x$ (0≤x≤2), Li$_{7-x}$PS$_{6-x}$Br$_x$ (0≤x≤2), Li$_{7-x}$PS$_{6-x}$I$_x$ (0≤x≤2), or a combination thereof. In particular, the argyrodite type solid ion conductor includes Li$_6$PS$_5$Cl, Li$_6$PS$_5$Br, Li$_6$PS$_5$I, or a combination thereof. The elastic modulus of the crystalline argyrodite type solid ion conductor is, for example, 30 gigaPascals (GPa) or more.

The solid electrolyte may be in the form of a powder or in a molded or monolithic form. The solid electrolyte in the molded form may be in the form of, for example, a pellet, a sheet, a thin films, or the like, but the form thereof is not limited thereto, and may have any suitable form depending on the intended use.

The solid electrolyte may further include an impurity phase in addition to the solid ion conductor represented by Formula 1. This impurity phase may be produced during the process of preparing the solid ion conductor.

Electrochemical Device

An electrochemical device according to an embodiment includes the solid ion conductor including the garnet-type oxide represented by Formula 1, and includes a cathode, an anode, and a solid electrolyte.

Since the electrochemical device includes the solid ion conductor including the garnet-type oxide represented by Formula 1, the lithium ion conductivity of the electrochemical device is improved, and the interface resistance thereof to lithium metal is reduced.

At least one selected from the cathode, the anode, the solid electrolyte, or a combination thereof included in the electrochemical device may include the solid ion conductor including the garnet-type oxide represented by Formula 1. The electrochemical device may further include a cathode protection layer, an anode protection layer, a solid electrolyte protection layer, or a combination thereof. The cathode protection layer, an anode protection layer, a solid electrolyte protection layer, or a combination thereof may include the solid ion conductor including the garnet-type oxide represented by Formula 1.

For example, the solid electrolyte of the electrochemical device may include the solid ion conductor including the garnet-type oxide represented by Formula 1. The solid ion conductor may be included in a solid electrolyte layer, a solid electrolyte protection layer, a cathode protection layer, an anode protection layer, or a combination thereof. The solid electrolyte protection layer may be a layer that is on a solid electrolyte layer and comprises the solid ion conductor, e.g., to provide a protected solid electrolyte layer. The cathode protection layer may be a layer that is on a cathode and comprises the solid ion conductor, e.g., to provide a protected cathode. The anode protection layer may be a layer that is on an anode and comprises the solid ion conductor, e.g., to provide a protected anode.

For example, the solid electrolyte layer disposed between the cathode and anode of the electrochemical device may include the solid ion conductor including the garnet-type oxide represented by Formula 1.

For example, the solid ion conductor including the garnet-type oxide represented by Formula 1 may be provided on one surface of at least one of the cathode, anode, or solid electrolyte of the electrochemical device.

Since the solid electrolyte layer including the garnet-type oxide represented by Formula 1 (i.e., protection layer) provides improved lithium ion conductivity and low interfacial resistance to lithium metal, the electrochemical device may provide improved charge-discharge characteristics.

For example, the solid electrolyte layer including the garnet-type oxide represented by Formula 1 is disposed on one surface of the anode to form an anode protection layer, and the anode may include a lithium metal, a lithium metal alloy, or a combination thereof.

The electrochemical device may be, for example, an all-solid secondary battery or a metal-air battery, but is not limited thereto. Any electrochemical device may be used as long as it may be used in the art.

Hereinafter, an all-solid secondary battery will be described in more detail.

Figure 5:
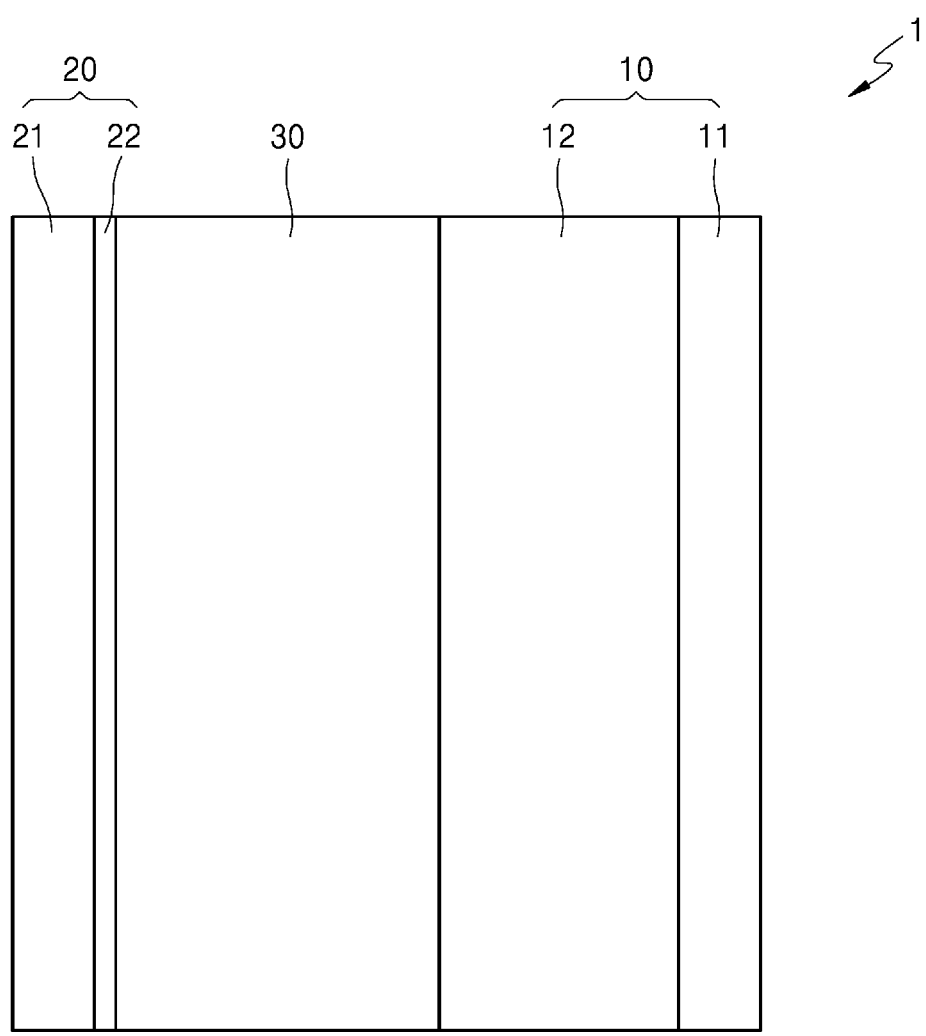
FIG. 5 is a cross-sectional view of an embodiment of an all-solid secondary battery.
Figure 6:
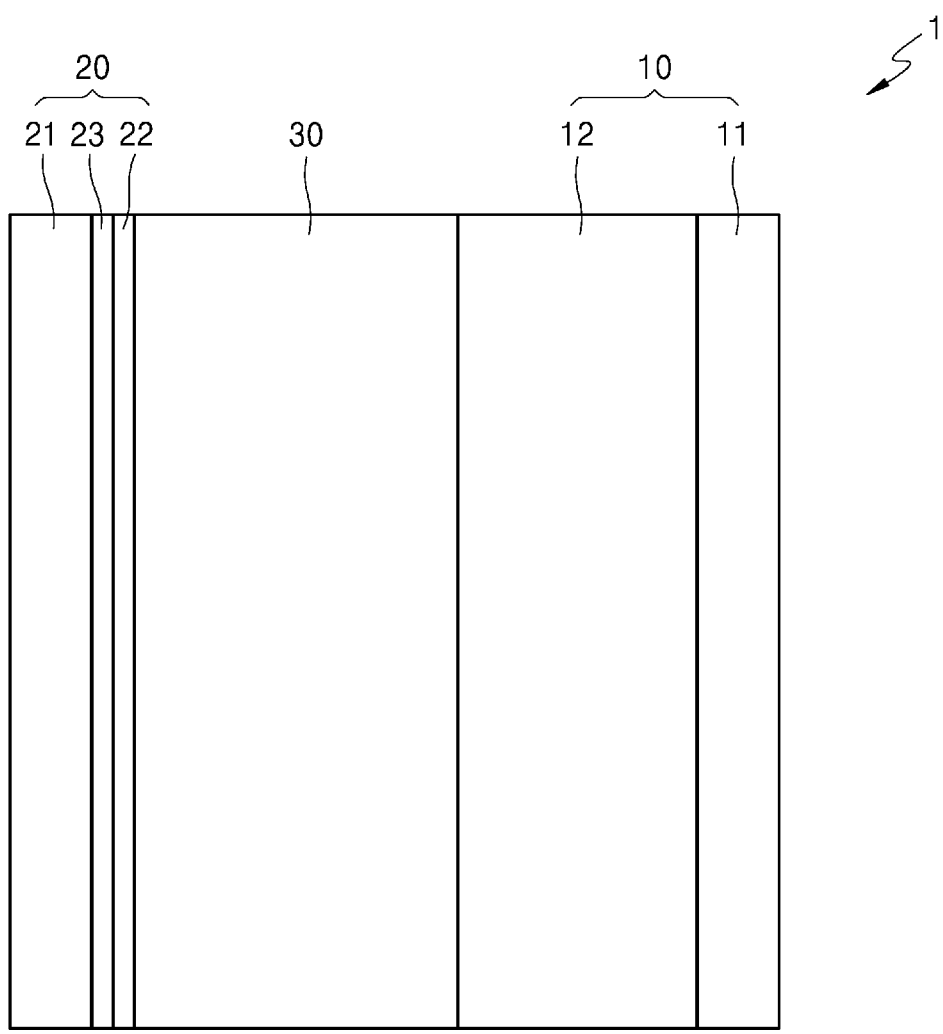
FIG. 6 is a cross-sectional view of another embodiment of an all-solid secondary battery.
Figure 7:
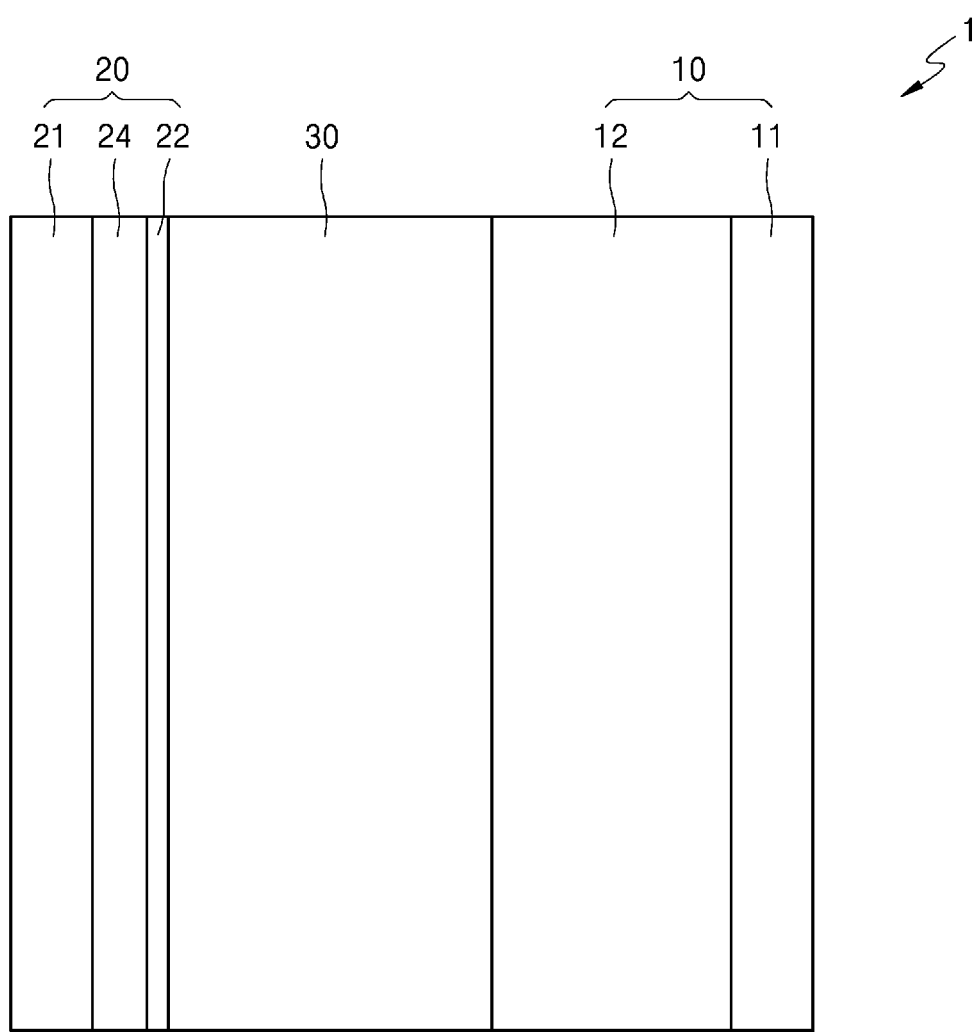
FIG. 7 is a cross-sectional view of still another embodiment of an all-solid secondary battery.

Referring to FIGS. 5 to 7, an all-solid secondary battery 1 includes a cathode 10 including a cathode active material layer 12, an anode 20, and a solid electrolyte layer 30 between the cathode 10 and the anode 20. The anode 20 includes an anode current collector 21 and a first anode active material layer 22 disposed on the anode current collector 21. The first anode active material layer 22 includes an anode active material forming an alloy or compound with lithium. At least one of the cathode 10, anode 20, and solid electrolyte layer of the all-solid secondary battery 1 includes the solid ion conductor including the garnet-type oxide represented by Formula 1.

Solid Electrolyte Layer

Referring to FIGS. 5 to 7, a solid electrolyte layer 30 is disposed between the cathode 10 and the anode 20, and includes a solid electrolyte.

The solid electrolyte included in the solid electrolyte layer 30 includes the solid ion conductor including the garnet-type oxide represented by Formula 1.

The solid electrolyte layer 30 may further include a second solid electrolyte together with the solid ion conductor including the garnet-type oxide represented by Formula 1. The second solid electrolyte is, for example, a sulfide-based solid electrolyte, an oxide-based solid electrolyte, or a combination thereof. The second solid electrolyte is, for example, an oxide-based solid electrolyte.

The oxide-based solid electrolyte may be $Li_{1+x+y}Al_xTi_{2-x}Si_yP_{3-y}O_{12}$ (0<x<2, 0≤y<3), $BaTiO_3$, $Pb(Zr_{1-a}Ti_a)O_3$ wherein 0≤a≤1 (PZT), $Pb_{1-x}La_xZr_{1-y}Ti_yO_3$ (PLZT)(0≤x<1, 0≤y<1), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (0<x<2, 0<y<3), $Li_xAl_yTi_z(PO_4)_3$ (0<x<2, 0<y<1, 0<z<3), $Li_{1+x+y}(Al_aGa_{1-a})_x(Ti_bGe_{1-b})_{2-x}Si_yP_{3-y}O_{12}$ (0≤x≤1, 0≤y≤1, 0≤a≤1, 0≤b≤1), $Li_xLa_yTiO_3$ (0<x<2, 0<y<3), $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ (M=Te, Nb, or Zr, 0≤x≤10). The solid electrolyte may be prepared by a sintering method. The oxide-based solid electrolyte is, for example, a garnet-type solid electrolyte, e.g., $Li_7La_3Zr_2O_{12}$ (LLZO) or $Li_{3+x}La_3Zr_{2-a}M_aO_{12}$ (M doped LLZO, M=Ga, W, Nb, Ta, or Al, 0≤x≤10).

The second solid electrolyte is, for example, a sulfide-based solid electrolyte. The sulfide-based solid electrolyte is, for example, at least one of $Li_2S$—$P_2S_5$, $Li_2S$—$P_2S_5$—$LiX$ (X is a halogen element), $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n are each a positive number, and Z is Ge, Zn, or Ga), $Li_2S$—$GeS_2$, $Li_2S$—$SiS_2$—$Li_3PO_4$, $Li_2S$—$SiS_2$—$Li_pMO_q$, (p and q are each a positive number, and M is P, Si, Ge, B, Al, Ga, or In), $Li_{7-x}PS_{6-x}Cl_x$(0≤x≤2), $Li_{7-x}PS_{6-x}Br_x$(0≤x≤2), or $Li_{7-x}PS_{6-x}I_x$(0≤x≤2). The sulfide-based solid electrolyte is prepared by treating a start material such as $Li_2S$ or $P_2S_5$ through melt quenching or mechanical milling. After this treatment, heat treatment may be performed. The sulfide-based solid electrolyte may be amorphous, crystalline, or a mixed state thereof. Further, the sulfide-based solid electrolyte may include at least sulfur (S), phosphorus (P), and lithium (Li) of the aforementioned materials of the sulfide-based solid electrolyte as constituents. For example, the sulfide-based solid electrolyte may include $Li_2S$—$P_2S_5$. When $Li_2S$—$P_2S_5$ is used as the material of the sulfide-based solid electrolyte, the mixing molar ratio of $Li_2S$ and $P_2S_5$ is, for example, in the range of $Li_2S$:$P_2S_5$=50:50 to 90:10.

The sulfide-based solid electrolyte may include, for example, an argyrodite-type solid electrolyte represented by Formula 9:

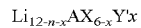

$$Li_{12-n-x}AX_{6-x}Y'_x \qquad \text{Formula 9}$$

wherein in Formula 9, A is P, As, Ge, Ga, Sb, Si, Sn, Al, In, Ti, V, Nb, or Ta, X is S, Se, Te, or a combination thereof, Y' is Cl, Br, I, F, CN, OCN, SCN, $N_3$, or a combination thereof and 1≤n≤5 and 0≤x≤2 are satisfied. The oxidation number of A is +n, the oxidation number of X is −2, and the oxidation number of Y' is −1.

The sulfide-based solid electrolyte may be an argyrodite type compound including at least one of $Li_{7-x}PS_{6-x}Cl_x$ (0≤x≤2), $Li_{7-x}PS_{6-x}Br_x$(0≤x≤2), or $Li_{7-x}PS_{6-x}I_x$(0≤x≤2). In particular, the sulfide-based solid electrolyte may be an argyrodite type compound including at least one of $Li_6PS_5Cl$, $Li_6PS_5Br$, or $Li_6PS_5I$.

The solid electrolyte layer 30 may further include a binder. Examples of the binder included in the solid electrolyte layer 30 may include, but are not limited to, styrene-butadiene rubber (SBR), polytetrafluoroethylene, polyvinylidene fluoride, and polyethylene. Any binder may be used as long as it is used in the art. The binder of the solid electrolyte layer 30 may be the same as or different from the binder of the cathode active material layer 12 and the binder of the anode active material layer 22.

The solid electrolyte layer 30 is formed by depositing the solid electrolyte comprising the solid ion conductor using a film forming method such as an aerosol deposition method, a cold spray method, or a sputtering method. Alternatively, the solid electrolyte layer 30 may be formed by pressing a single solid electrolyte particle body. Alternatively, the solid electrolyte layer 30 may be formed by applying a mixture of a solid electrolyte, a solvent, and a binder and drying and pressing the applied mixture.

Cathode Layer

The cathode 10 includes a cathode current collector 11 and a cathode active material layer 12.

The cathode current collector 11 is, for example, a plate or foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 includes, for example, a cathode active material.

The cathode active material is a cathode active material capable of reversibly absorbing and desorbing lithium ions. Examples of the cathode active material may include, but are not limited to, lithium transition metal oxides such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate; nickel sulfide; copper sulfide; lithium sulfide; iron oxide; and vanadium oxide. Any cathode active material may be used as long as it is used in the art. These cathode active materials may be used alone or as a mixture of two or more cathode active materials.

The cathode active material can include a lithium salt of a transition metal oxide having a layered rock salt type structure among the lithium transition metal oxides. The lithium transition metal oxide having a layered rock salt type structure is, for example, a ternary lithium transition metal oxide such as $LiNi_xCo_yAl_zO_2$ (NCA) or $LiNi_xCo_yMn_zO_2$ (NCM) ($0<x<1$, $0<y<1$, $0<z<1$, $x+y+z=1$). When the cathode active material includes a ternary lithium transition metal oxide having a layered rock salt structure, the energy density and thermal stability of an all-solid secondary battery 1 can be further improved.

As described, the cathode active material may be covered by a coating layer. Any coating layer may be used without limitation as long as it is known as the coating layer of the cathode active material of an all-solid secondary battery. The coating layer can include, for example, $Li_2O$—$ZrO_2$.

When the cathode active material includes nickel (Ni) as a ternary lithium transition metal oxide such as NCA or NCM, the capacity density of the all-solid secondary battery 1 may increase, further when the cathode active material is covered by a coating layer such as $Li_2O$—$ZrO_2$, reducing the elution of metals in the cathode active material under a charged state can be obtained. As a result, the cycle characteristics of the all-solid secondary battery 1 can be improved.

The shape of the cathode active material is, for example, a particle shape such as a spherical sphere or an elliptical sphere. The particle diameter of the cathode active material is not particularly limited, and is within a range applicable to the cathode active material of a conventional all-solid secondary battery. The content of the cathode active material of the cathode 10 is also not particularly limited, and is within a range applicable to the cathode layer of a conventional all-solid secondary battery.

The cathode 10 may further include additives such as a conducting agent, a binder, a filler, a dispersant, and an ion conductive auxiliary agent in addition to the cathode active material. Examples of the conducting agent include graphite, carbon black, acetylene black, Ketjen black, carbon fiber, and metal powder. Examples of the binder include styrene-butadiene rubber (SBR), polytetrafluoroethylene, polyvinylidene fluoride, and polyethylene. As a filler, a coating agent, a dispersant, an ion conductive auxiliary agent, etc. that can be blended into the cathode 10, known materials generally used for an electrode of a solid secondary battery can be used.

The cathode 10 may further include the solid ion conductor including the garnet-type oxide represented by Formula 1 as a solid electrolyte. The solid electrolyte included in the cathode 10 is similar to or different from the solid electrolyte 30 included in the solid electrolyte layer.

The cathode 10 may be prepared, for example, by the following method.

A cathode active material, a carbon-based conductive material, and a binder, which are materials constituting the cathode active material layer 12, are mixed to prepare a slurry. The prepared slurry is applied on the cathode current collector 11 and then dried to obtain a laminate. The obtained laminate is pressed to prepare the cathode 10. The pressing is pressing using isotactic pressure, such as roll pressing or flat pressing, but is not limited thereto. Any pressing may be used as long as it is used in the art. The pressing process may be omitted. Alternatively, the cathode 10 is prepared by compacting a mixture of materials constituting the cathode active material layer 12 into a pellet form or stretching (forming) the mixture into a sheet form. When the cathode 10 is prepared by this method, the cathode current collector 11 may be omitted.

Anode Layer

The anode 20 includes an anode current collector 21 and a first anode active material layer 22.

The anode current collector 21 is made of, for example, a material that does not react with lithium, that is, a material that does not form either an alloy or a compound. Examples of the material constituting the anode current collector 21 include, but are not limited to, copper (Cu), stainless steel, titanium (Ti), iron (Fe), cobalt (Co), and nickel (Ni). Any material may be used as long as it is used for an electrode current collector in the art. The anode current collector 21 may be formed of one of the aforementioned metals, or may be formed of an alloy or a coating material of two or more of the aforementioned metals. The anode current collector 21 has, for example, a plate shape or a foil shape. The anode current collector 21 may be omitted.

The first anode active material layer 22 may include at least one anode active material selected from carbon-based anode active materials and metal or metalloid anode active materials.

The metal or metalloid anode active material may have a lithium ion diffusion coefficient higher than the lithium ion diffusion coefficient of a lithium metal. The metal or metalloid anode active material may have a lithium ion diffusion coefficient higher than the lithium ion diffusion coefficient of a lithium metal, thereby causing the lithium diffused into the first anode active material layer 22 to quickly pass through the first anode active material layer 22 and precipitate in the form of a uniform lithium metal layer between the first anode active material layer 22 and the anode current collector 21.

The metal or metalloid anode active material may include at least one selected from indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), palladium (Pd), silver (Ag), and zinc (Zn), but is not limited thereto, and any metal anode active material or any metalloid anode active material may be used as long as it forms an alloy or a compound with lithium in the art. For example, nickel (Ni) is not a metal anode active material because it does not form an alloy with lithium.

The carbon-based anode active material is crystalline carbon or amorphous carbon. The crystalline carbon is, for example, graphite.

In particular, the carbon-based cathode active material is amorphous carbon. Examples of the amorphous carbon include, but are not limited to, carbon black (CB), acetylene black (AB), furnace black (FB), ketjen black (KB), graphene, carbon nanotube, or carbon nanofiber. Any amorphous carbon may be used as long as it is classified as amorphous carbon in the art. Amorphous carbon has no crystallinity or very low crystallinity, and is distinguished from crystalline carbon or graphite-based carbon.

The anode active material included in the first anode active material layer 22 has, for example, a particle shape. The average particle diameter of the anode active material having a particle shape is, for example, about 4 μm or less, about 3 μm or less, about 2 μm or less, about 1 μm or less, or about 900 nm or less. The average particle diameter of the anode active material having a particle shape is, for example, about 10 nm to about 4 μm, about 10 nm to about 3 μm, about 10 nm to about 2 μm, about 10 nm to about 1 μm, or about 10 nm to about 900 nm. Since the anode active material has an average particle diameter in this range, it may be easier to reversibly absorb and/or desorb lithium during charging and discharging. The average particle diameter of the anode active material is, for example, a median diameter (D50) measured using a laser particle size distribution meter.

The first anode active material layer 22 includes one anode active material among such anode active materials, or a mixture of different anode active materials among such anode active materials. The mixing ratio of a mixture of amorphous carbon and metal or metalloid is, for example, 10:1 to 1:2, 5:1 to 1:1, or 4:1 to 2:1 by a weight ratio, but is not necessarily limited to this range and is selected according to the required characteristics of the all-solid secondary battery 1. As the anode active material has such a composition, the cycle characteristics of the all-solid secondary battery 1 may be further improved.

The first anode active material layer 22 may further include, for example, a binder. Examples of the binder include, but are limited to, styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, and polymethyl methacrylate. Any binder may be used as long as it is used in the art. The binder may be used alone or in a combination of different binders. The binder is, for example, an aqueous binder or a non-aqueous binder. The aqueous binder is a binder that is used in a state of being dissolved in water or is used in a state of being dispersed in water. The non-aqueous binder is a binder that is used in a state of being dissolved in an organic solvent.

The thickness of the first anode active material layer 22 is, for example, about 50% or less, about 40% or less, about 30% or less, about 20% or less, about 10% or less, or about 5% or less of the thickness of the cathode active material layer. The thickness of the first anode active material layer 22 is, for example, about 1 μm to about 50 μm, about 1 μm to about 40 μm, about 1 μm to about 20 μm, about 2 μm to about 15 μm, about 3 μm to about 10 μm, or about 5 μm to about 10 μm. When the thickness of the first anode active material layer 22 is too thin, lithium dendrite formed between the first anode active material layer 22 and the anode current collector 21 collapses the first anode active material layer 22, so that it is difficult to improve the cycle characteristics of the solid secondary battery 1. When the thickness of the first anode active material layer 22 excessively increases, the energy density of the all-solid secondary battery 1 decreases, and the internal resistance of the all-solid secondary battery 1 due to the first anode active material layer 22 increases, so that it can be difficult to improve the cycle characteristics of the all-solid secondary battery 1.

The first anode active material layer 22 may further include additives such as a filler, a dispersant, and an ion conducting agent used in a conventional all-solid secondary battery.

Referring to FIG. 6, the all-solid secondary battery 1 further includes, for example, a thin film 23 including an element capable of forming an alloy with lithium on the anode current collector 21. The thin film 23 is disposed between the anode current collector 21 and the first anode active material layer 22. The thin film 23 includes, for example, an element capable of forming an alloy with lithium. Examples of the element capable of forming an alloy with lithium include, but are not limited to, gold, silver, zinc, tin, indium, silicon, aluminum, and bismuth. Any element may be used as long as it may form an alloy with lithium. The thin film 23 is formed of one of these metals, or is formed of an alloy of several kinds of metals. Since the thin film 23 is disposed on the anode current collector 21, for example, the deposition form of the second anode active material layer (not shown) deposited between the thin film 23 and the first anode active material layer 22 may be further flattened, and the cycle characteristics of the all-solid secondary battery 1 may be further improved.

The thickness of the thin film 23 is, for example, about 1 nm to about 800 nm, about 10 nm to about 700 nm, about 50 nm to about 600 nm, or about 100 nm to about 500 nm. When the thickness of the thin film 23 is less than 1 nm, it may be difficult to exhibit the function of the thin film 23. When the thickness of the thin film 23 is too thick, the thin film 23 itself absorbs lithium to decrease the plating (i.e., deposition) amount of lithium at the anode, thereby decreasing the energy density of the all-solid-state battery and deteriorating the cycle characteristics of the all-solid secondary battery 1. The thin film 23 may be disposed on the anode current collector 21 by, for example, a vacuum deposition method, a sputtering method, or a plating method, but the deposition method thereof is not limited to this method, and any method capable of forming the thin film 23 in the art may be used. The thin film 23 may be, for example, a plating layer.

Referring to FIG. 7, the all-solid secondary battery 1 further includes, for example, a second anode active material layer 24 disposed between the anode current collector 21 and the first anode active material layer 22. The second anode active material layer 24 may be plated between the anode current collector 21 and the first anode active material layer 22. The second anode active material layer 24 is a metal layer including lithium or a lithium alloy. The second anode active material layer 24 may be a plated layer. The metal layer includes lithium or a lithium alloy. Accordingly, since the second anode active material layer 24 is a metal layer including lithium, it acts as, for example, a lithium reservoir. Examples of the lithium alloy include, but are not limited to, a Li—Al alloy, a Li—Sn alloy, a Li—In alloy, a Li—Ag alloy, a Li—Au alloy, a Li—Zn alloy, a Li—Ge alloy, and a Li—Si alloy. Any lithium alloy may be used as long as it is used in the art. The second anode active material layer 24 may be formed of one of these alloys or lithium, or may be formed of several kinds of alloys. Although not shown in the drawings, the all-solid secondary battery 1 may further include, for example, a second anode active material layer 24 disposed between the first anode active material layer 22 and the solid electrolyte layer 30. The second anode active material layer 24 may be plated between the first anode active material layer 22 and the solid electrolyte layer 30.

The thickness of the second anode active material layer 24 is not particularly limited, but is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the second anode active material layer 24 is too thin, it is difficult for the second anode active material layer 24 to serve as a lithium reservoir. When the thickness of the second anode active material layer 24 is too thick, there is a possibility that the mass and volume of the all-solid secondary battery 1 increase and the cycle characteristics thereof can deteriorate. The second anode active material layer 24 may be, for example, a metal foil having a thickness within the above-described ranges. The second anode active material layer 24 may be disposed on the anode current collector 21 when the anode 20 is prepared.

The anode 20 may be prepared by the following method.

An anode active material, a conductive material, and a binder, which are materials constituting the first anode active material layer 22, are added to a polar solvent or a non-polar solvent to prepare a slurry. The prepared slurry is applied onto a releasable substrate, for example, the anode current collector 21, and dried to dispose the first anode active material layer 22 on the anode current collector 21 and press the first anode active material layer 22 to prepare the anode 20 that is a laminate of the anode current collector 21 and the first anode active material layer 22. The pressing is pressing using isotactic pressure, such as roll pressing or flat pressing, but is not limited thereto. Any pressing may be used as long as it is used in the art. The pressing can be performed at a temperature of room temperature to about 90° C. or less, for example, about 20° C. to about 90° C. Alternatively, pressing is performed at a high temperature of about 100° C. or higher. The pressing process may be omitted.

Manufacture of all-Solid Secondary Battery

The cathode 10, the anode 20, and the solid electrolyte layer, which have been prepared by the above-described method, are laminated such that the cathode 10 and the anode 20 have the solid electrolyte 30 therebetween, and then pressed, thereby manufacturing the all-solid secondary battery 1. The pressing process may be omitted.

Method of Preparing Solid Ion Conductor

A method of preparing a solid ion conductor according to an embodiment includes: providing a precursor mixture including a precursor for forming a solid ion conductor; and heat-treating the precursor mixture under an oxidative atmosphere to provide a solid ion conductor including a garnet-type oxide represented by Formula 1.

When preparing the precursor mixture, a Li precursor, a La precursor, a Zr precursor, an M1 precursor, an M2 precursor, an M3 precursor, an M4 precursor and an X precursor may be mixed.

In Formula 1, when B=0, the M1 precursor is omitted, when D=0, the M2 precursor is omitted, and when I=0, the X precursor may be omitted.

The lithium precursor includes oxide, nitride, oxynitride, nitrate, hydroxide or carbonate, each containing lithium. For example, lithium carbonate and lithium nitrate are exemplified.

The precursor compound containing a monovalent cationic element includes oxide, nitride, oxynitride, nitrate, hydroxide or carbonate containing an element such as Na, K, Rb, Cs, H, or Fr.

The precursor compound containing a divalent cationic element includes oxide, nitride, oxynitride, nitrate, hydroxide or carbonate containing an element such as Mg, Ca, Ba, or Sr.

The precursor compound containing a trivalent cationic element includes oxide, nitride, oxynitride, nitrate, hydroxide or carbonate containing an element such as In, Sc, Cr, Au, B, Al, or Ga.

The precursor compound containing a tetravalent cationic element includes oxide, nitride, oxynitride, nitrate, hydroxide or carbonate containing an element such as Sn, Ti, Mn, Ir, Ru, Pd, Mo, Hf, Ge, V, or Si.

The precursor compound containing a pentavalent cationic element includes oxide, nitride, oxynitride, nitrate, hydroxide or carbonate containing an element such as Nb, Ta, Sb, V, or P.

The garnet-type oxide represented by Formula 1 can be prepared by combining precursor compounds in an appropriate amount, for example, in a stoichiometric amount to form a mixture and heat-treating the mixture. The combining may include milling such as ball milling, or pulverizing.

The mixture of precursors mixed in a stoichiometric composition may be subjected to primary heat treatment in an oxidative atmosphere to prepare a primary heat treated product. The primary heat treatment may be performed for about 1 hour to about 36 hours at a temperature range of about 600° C. to about 1100° C.

The first heat treatment may be performed at, for example, about 600° C. to about 1100° C., about 700° C. to about 1100° C., about 800° C. to about 1050° C., about 900° C. to about 1050° C., or about 9500° C. to about 1050° C. The primary heat treatment time is about 1 hour to about 36 hours, about 2 hours to about 24 hours, about 4 hours to about 20 hours, about 8 hours to about 16 hours, or about 10 hours to about 14 hours. The temperature increase rate of the mixture during the heat treatment of the mixture may be about 1° C./min to about 10° C./min.

The method of preparing a solid ion conductor may further include: molding the solid ion conductor to prepare a molded product after subjecting the precursor mixture to the primary heat treatment in an oxidative atmosphere; and subjecting the molded product to secondary heat treatment at about 900° C. to about 1500° C. to prepare a sintered product, wherein the secondary heat treatment of the molded product is performed at a higher temperature than the heat treatment of the precursor mixture. For example, the secondary heat treatment temperature is higher than the primary heat treatment temperature.

The primary heat treated product may be pulverized. The pulverization of the primary heat treated product may be performed by dry pulverizing or wet pulverizing. The wet pulverizing may be performed, for example, by mixing a solvent such as methanol and the primary heat treated product and then milling the mixture for about 0.5 hours to about 10 hours with a ball mill or the like. The dry grinding may be performed by milling with a ball mill or the like without a solvent. The particle diameter of the pulverized primary heat treatment product may be about 0.1 μm to about 10 μm, or about 0.1 μm to about 5 μm. The pulverized primary heat treated product may be dried.

The pulverized primary heat treated product may be mixed with a binder solution and formed into a pellet, or may be roll-pressed at a pressure of about 1 ton to 1 about 0 tons for about 1 minute to about 10 minutes without a binder and formed into a pellet.

The molded product may be subjected to secondary heat treatment for about 1 hour to about 36 hours at a temperature of about 900° C. to about 1500° C. A sintered product is obtained by secondary heat treatment.

The secondary heat treatment may be performed at about 900° C. to about 1400° C., about 950° C. to about 1350° C., about 1000° C. to about 1300° C., or about 1100° C. to about 1300° C. The first heat treatment time is about 1 hour to about 36 hours, about 1 hour to about 24 hours, about 1 hour to about 12 hours, about 1 hour to about 10 hours, or about 2 hours to about 6 hours.

In order to obtain the sintered product, the secondary heat treatment temperature is higher than the first heat treatment temperature. For example, the secondary heat treatment temperature may be higher than the first heat treatment temperature by about 10° C. or more, about 20° C. or more, about 30° C. or more, or about 50° C. or more.

The pellet may be subjected to secondary heat treatment in at least one of an oxidative atmosphere or a reducing atmosphere.

The secondary heat treatment may be performed in a) an oxidative atmosphere, b) a reducing atmosphere, or c) an oxidative atmosphere and a reducing atmosphere. The secondary heat treatment atmosphere may be selected according to the composition of the precursor included in the solid ion conductor.

a) The oxidizing atmosphere is an atmosphere containing an oxidative gas. The oxidative gas is, for example, oxygen or air, but is not necessarily limited to oxygen or air, and any oxidative gas may be used as long as it is used in the art. The oxidative atmosphere may be a mixture of an oxidative gas and an inert gas. As the inert gas, it is possible to use the same gas as the inert gas used in a reducing atmosphere.

b) The reducing atmosphere is an atmosphere containing a reducing gas. The reducing gas is, for example, hydrogen ($H_2$), but is not necessarily limited to hydrogen, and any reducing gas may be used as long as it is used in the art. The reducing atmosphere may be a mixture of a reducing gas and an inert gas. The inert gas is, for example, nitrogen and argon, but is not necessarily limited thereto, and any inert gas may be used as long as it is used in the art. The content of the reducing gas in the reducing atmosphere is, for example, about 1% to about 99%, about 2% to about 50%, or about 5% to about 20% of the total gas content.

c) The step of performing the secondary heat treatment in an oxidative atmosphere and a reducing atmosphere means a step of performing the secondary heat treatment in which heat treatment in an oxidizing atmosphere and heat treatment in a reducing atmosphere are sequentially performed. The oxidative atmosphere and the reducing atmosphere are the same as a) the aforementioned oxidative atmosphere and b) the aforementioned reducing atmosphere, respectively.

Hereinafter, the present disclosure will be described in more detail with reference to Examples and Comparative Examples. However, these Examples and Comparative Examples are intended to illustrate technical ideas, and the scope of the present disclosure is not limited thereto.

EXAMPLES

Preparation of Solid Ion Conductor

Example 1: Preparation of $Li_{6.5}La_3Zr_{1.4}Ta_{0.5}Ru_{0.1}O_{12}$

Preparation of Solid Ion Conductor Powder

Lithium precursor $Li_2O$, lanthanum precursor $La_2O_3$, zirconium precursor $ZrO_2$, tantalum precursor $Ta_2O_5$, and ruthenium precursor $RuO_2$ were combined in a stoichiometric ratio, and then mixed for 10 minutes using a planetary mill (Pulverisette 7 premium line) and left for 5 minutes. This cycle was repeatedly carried out 12 times to obtain a precursor mixture. The obtained precursor mixture was primarily heat-treated at 1000° C. for 12 hours at a temperature increase rate of 5° C./min to prepare solid ion conductor powder. The composition of the prepared solid ion conductor powder was $Li_{6.5}La_3Zr_{1.4}Ta_{0.5}Ru_{0.1}O_{12}$.

Preparation of Solid Ion Conductor Pellet

The prepared solid ion conductor powder was put into a pelletizer having a diameter of 1 inch, and a weight of 5 tons was applied for 2 minutes using uniaxial pressure to obtain a circular disk-shaped pellet. The obtained pellet was placed on MgO single crystal, and was covered by the primarily heat-treated solid ion conductor powder to prevent lithium volatilization and composition change. Subsequently, the resulting product was secondarily heat-treated at 1200° C. for 4 hours at a temperature increase rate of 5° C./min to prepare a solid ion conductor pellet.

Example 2: Preparation of $Li_{6.5}La_3Zr_{1.3}Ta_{0.5}Ru_{0.2}O_{12}$

A solid ion conductor was prepared in the same manner as in Example 1, except that the stoichiometric ratio of $ZrO_2$ and $RuO_2$ was changed.

The composition of the prepared solid ion conductor was $Li_{6.5}La_3Zr_{1.3}Ta_{0.5}Ru_{0.2}O_{12}$.

Example 3: Preparation of $Li_{6.5}La_3Zr_{1.4}Ta_{0.5}Ir_{0.1}O_{12}$

A solid ion conductor was prepared in the same manner as in Example 1, except that, as the precursor mixture, a mixture of $Li_2O$, $La_2O_3$, $ZrO_2$, $Ta_2O_5$, and $IrO_2$ was used instead of a mixture of $Li_2O$, $La_2O_3$, $ZrO_2$, $Ta_2O_5$, and $RuO_2$. The composition of the prepared solid ion conductor was $Li_{6.5}La_3Zr_{1.4}Ta_{0.5}Ir_{0.1}O_{12}$.

Example 4: Preparation of $Li_{6.5}La_3Zr_{1.3}Ta_{0.5}Ir_{0.2}O_{12}$

A solid ion conductor was prepared in the same manner as in Example 3, except that the stoichiometric ratio of $ZrO_2$ and $IrO_2$ was changed.

The composition of the prepared solid ion conductor was $Li_{6.5}La_3Zr_{1.3}Ta_{0.5}Ir_{0.2}O_{12}$.

Example 5: Preparation of $Li_{6.5}La_3Zr_{1.4}Ta_{0.5}Mn_{0.1}O_{12}$

A solid ion conductor was prepared in the same manner as in Example 1, except that, as the precursor mixture, a mixture of $Li_2O$, $La_2O_3$, $ZrO_2$, $Ta_2O_5$, and $MnO_2$ was used instead of a mixture of $Li_2O$, $La_2O_3$, $ZrO_2$, $Ta_2O_5$, and $RuO_2$. The composition of the prepared solid ion conductor was $Li_{6.5}La_3Zr_{1.4}Ta_{0.5}Mn_{0.1}O_{12}$.

Example 6: Preparation of $Li_{6.5}La_3Zr_{1.4}Ta_{0.5}Sn_{0.1}O_{12}$

A solid ion conductor was prepared in the same manner as in Example 1, except that, as the precursor mixture, a mixture of $Li_2O$, $La_2O_3$, $ZrO_2$, $Ta_2O_5$, and $SnO_2$ was used instead of a mixture of $Li_2O$, $La_2O_3$, $ZrO_2$, $Ta_2O_5$, and $RuO_2$. The composition of the prepared solid ion conductor was $Li_{6.5}La_3Zr_{1.4}Ta_{0.5}Sn_{0.1}O_{12}$.

Example 7: Preparation of $Li_7La_3Zr_{0.49}Ta_{0.49}Hf_{0.49}Sc_{0.49}Ru_{0.04}O_{12}$ A solid ion conductor was prepared in the same manner as in Example 1, except that, as the precursor mixture, a mixture of $Li_2O$, $La_2O_3$, $ZrO_2$, $Ta_2O_5$, $RuO_2$, $HfO_2$, and $Sc_2O_3$ combined in a stoichiometric ratio was used instead of a mixture of $Li_2O$, $La_2O_3$, $ZrO_2$, $Ta_2O_5$, and $RuO_2$. The composition of the prepared solid ion conductor was $Li_7La_3Zr_{0.49}Ta_{0.49}Hf_{0.49}Sc_{0.49}Ru_{0.04}O_{12}$.

Example 8: Preparation of $Li_7La_3Zr_{0.475}Ta_{0.475}Hf_{0.475}Sc_{0.475}Ru_{0.1}O_{12}$ A solid ion conductor was prepared in the same manner as in Example 7, except that the stoichiometric ratio of $ZrO_2$, $Ta_2O_5$, $RuO_2$, $HfO_2$, and $Sc_2O_3$ was changed.

The composition of the prepared solid ion conductor was $Li_7La_3Zr_{0.475}Ta_{0.475}Hf_{0.475}Sc_{0.475}Ru_{0.1}O_{12}$.

Comparative Example 1: Preparation of $Li_{6.5}La_3Zr_{1.5}Ta_{0.5}O_{12}$

A solid ion conductor was prepared in the same manner as in Example 1, except that, as the precursor mixture, a mixture of $Li_2O$, $La_2O_3$, $ZrO_2$, and $Ta_2O_5$ was used instead of a mixture of $Li_2O$, $La_2O_3$, $ZrO_2$, $Ta_2O_5$, and $RuO_2$. The composition of the prepared solid ion conductor was $Li_{6.5}La_3Zr_{1.5}Ta_{0.5}O_{12}$.

Comparative Example 2: Preparation of $Li_7La_3Zr_{0.5}Hf_{0.5}Sn_{0.5}Ru_{0.5}O_{12}$ A solid ion conductor was prepared in the same manner as in Example 1, except that, as the precursor mixture, a mixture of $Li_2O$, $La_2O_3$, $ZrO_2$, $HfO_2$, $SnO_2$, and $RuO_2$ combined in a stoichiometric ratio was used instead of a mixture of $Li_2O$, $La_2O_3$, $ZrO_2$, $Ta_2O_5$, and $RuO_2$.

The composition of the prepared solid ion conductor was $Li_7La_3Zr_{0.5}Hf_{0.5}Sn_{0.5}Ru_{0.5}O_{12}$.

Manufacture of all-Solid Secondary Battery

Example 9

Preparation of Solid Electrolyte Layer-Anode Layer Laminate

The solid ion conductor pellet obtained in Example 1 was prepared. A copper (Cu) current collector having a thickness of 10 μm was disposed on one surface of the pellet, a foil having a thickness of 20 μm and deposited with lithium was disposed on one surface of the copper (Cu) current collector, and a pressure of 250 MPa was applied thereto at 25° C. by cold isostatic pressing (CIP) to attach a lithium electrode and an anode current collector onto the solid ion conductor pellet to prepare a solid electrolyte layer-lithium layer-anode current layer laminate.

Preparation of Cathode Layer $LiNi_{0.8}Co_{0.15}Mn_{0.05}O_2$ (NCM) was prepared as a cathode active material.

Further, polytetrafluoroethylene (Teflon (registered trademark) manufactured by DuPont Corporation) was prepared as a binder. Further, carbon nanofibers (CNF) were prepared as a conductive auxiliary agent. Thereafter, these materials were mixed in a weight ratio of cathode active material: conductive auxiliary agent:binder=100:2:1. The mixture was stretched in the form of a sheet to prepare a cathode active material sheet. Then, this cathode active material sheet was pressed to a cathode current collector made of an aluminum foil having a thickness of 18 μm to prepare a cathode layer.

The cathode active material layer of the prepared cathode layer was immersed into an electrolyte solution in which 2.0 M LiFSI (lithium bis(fluorosulfonyl)imide) was dissolved in ionic liquid Pyr13FSI (N-propyl-N-methyl-pyrrolidinium bis(fluorosulfonyl)imide.

Manufacture of all-Solid Secondary Battery

The cathode layer was disposed in a SUS cap such that the cathode active material layer impregnated into the ionic liquid electrolyte faces upward. The solid electrolyte layer-cathode layer laminate was disposed on the cathode active material layer such that the cathode active material layer and the solid electrolyte layer are in contact with each other, and sealed to prepare an all-solid secondary battery. The anode layer and the cathode layer were insulated with an insulator. A part of the cathode current collector and a part of the anode current collector protruded out of the sealed battery and were used as a cathode layer terminal and an anode layer terminal.

Examples 10 to 16

All-solid secondary batteries were manufactured in the same manner as in Example 9, except that the solid ion conductor pellets prepared in Examples 2 to 8 were used.

Comparative Examples 3 and 4

All-solid secondary batteries were manufactured in the same manner as in Example 9, except that the solid ion conductor pellets prepared in Comparative Examples 1 and 2 were used.

Evaluation Example 1: X-Ray Diffraction Analysis

XRD spectra were measured for the solid ion conductor power prepared in Examples 1 to 8 and Comparative Example 1, and some of the results thereof are shown in FIG. 1. Cu Kα radiation was used for XRD analysis.

As shown in FIG. 1, it was found that the solid ion conductors of Example 1, Example 2, and Comparative Example 1 have the same crystal structure. That is, it was found that, in Examples 1 and 2, there is no change in the crystal structure regardless of Ru substitution.

It was found that each of the solid ion conductors of Example 1, Example 2, and Comparative Example 1 has a garnet-like structure including a cubic phase because it show a single peak in an area where a diffraction angle 2θ is 16° to 17.5°.

Evaluation Example 2: Ion Conductivity Measurement

The pellets prepared in Examples 1 to 8 and Comparative Examples 1 to 2 were mirror-polished by sequentially using 1200/2000/4000/7000 sandpaper. Subsequentially, Au layer having a diameter of 8 mm is deposited on both surfaces of the pellet by sputtering using sputtering equipment to form an Au electrode, thereby preparing a structure composed of Au electrode/solid ion conductor pellet/Au electrode.

In the structure composed of Au electrode/solid ion conductor pellet/Au electrode, analysis using electrochemical impedance spectroscopy (EIS) was carried out by connecting wires to both surfaces of the Au electrode. The EIS analysis was carried out under conditions of an amplitude of about 10 mV and a frequency of 0.1 Hz to $10^6$ Hz. The impedance of the pellet was measured at room temperature (25° C.) by a 2-probe method using potentiostat/galvanostat and a 1455 frequency response analyzer (FRA) multi-channel test module (Solatron Analytical, UK) as an impedance analyzer. The impedance thereof was measured in a dry room with a dew point of −60 degree or less. Resistance values were obtained from the arc of the Nyguist plot for the impedance measurement results, and the area of an electrode area and the thickness of a pellet were corrected from the resistance values to calculate ion conductivity, and the results thereof are shown in Table 1.

Figure 2:
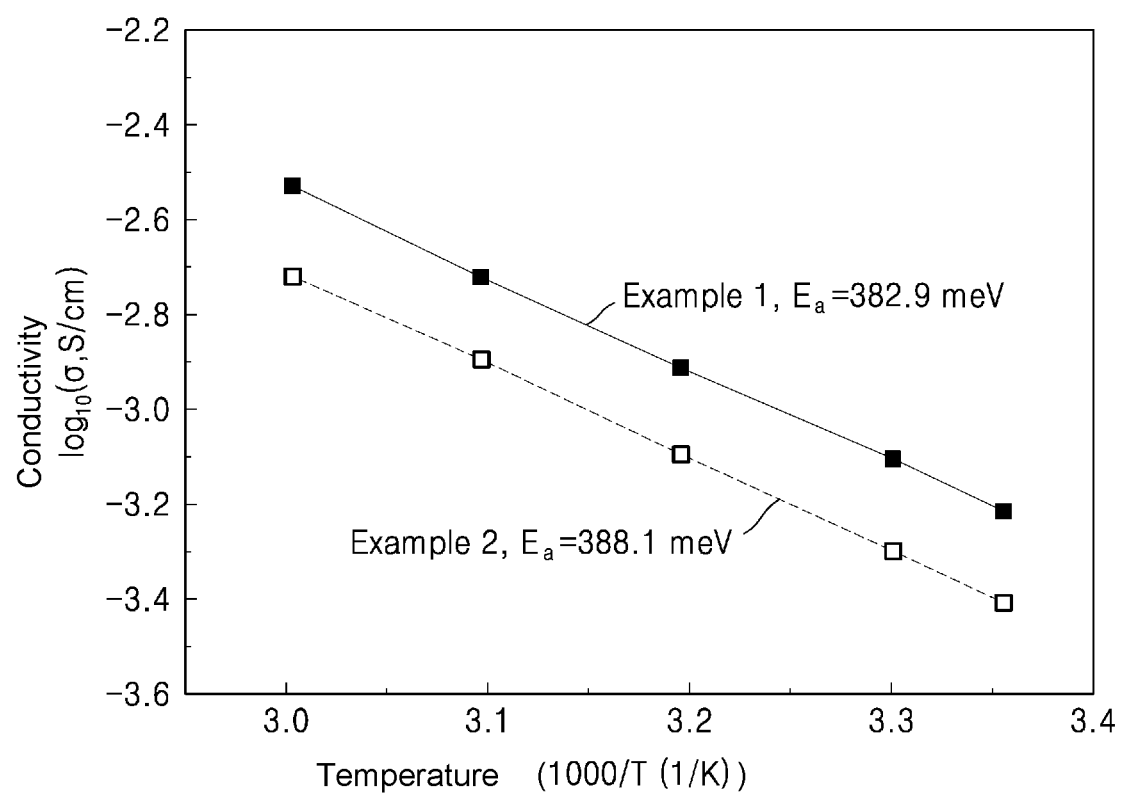
FIG. 2 is a graph of conductivity (σ, Siemens per centimeter, S/cm) versus temperature (1000/T, 1/Kelvin, 1/K) and shows the results of Arrhenius analysis of the solid ion conductors prepared in Example 1 and Example 2.

Further, ion conductivity according to temperature was measured by changing the temperature of the chamber containing the pellets during impedance measurement. The change in ion conductivity according to temperature was converted to the shown Arrhenius plot to calculate activation energy according to Arrhenius Equation represented by Equation 1 from the slope of the Arrhenius plot. Some of the results thereof are shown in Table 1 and FIG. 2.

$$\sigma = A \exp(-Ea/kT) \quad \text{Equation 1}$$

In Equation 1, $\sigma$ is conductivity, A is a frequency factor, Ea is activation energy, k is Boltzmann's constant, and T is absolute temperature.

TABLE 1

|  | Activation energy [eV] | Room temperature (25° C.) Ion conductivity [S/cm] |
|---|---|---|
| Example 1 | 0.3829 | $6.14 \times 10^{-4}$ |
| Example 2 | 0.3881 | $3.94 \times 10^{-4}$ |
| Comparative Example 1 | — | $8.36 \times 10^{-4}$ |

As shown in Table 1, the solid ion conductors of Examples 1 to 2 exhibit conductivity of $3 \times 10^{-4}$ S/cm or more at room temperature. The solid ion conductors of Examples 1 to 2 exhibit ion conductivity similar to that of Comparative Example 1.

The solid ion conductors of Examples 1 to 2 exhibit a low activation energy of 0.4 eV or less at room temperature.

Evaluation Example 3: Raman Spectrum Measurement

For the solid ion conductors prepared in Examples 1 to 5 and Comparative Example 1, Raman spectra in the range of 50 $cm^{-1}$ to 1400 $cm^{-1}$ were obtained using a 514 nm laser source of about 1 mW output of Reinshaw Corporation's inVis equipment after being left in the air for 24 hours immediately after the preparation of the solid ion conductors thereof.

Figure 3A:
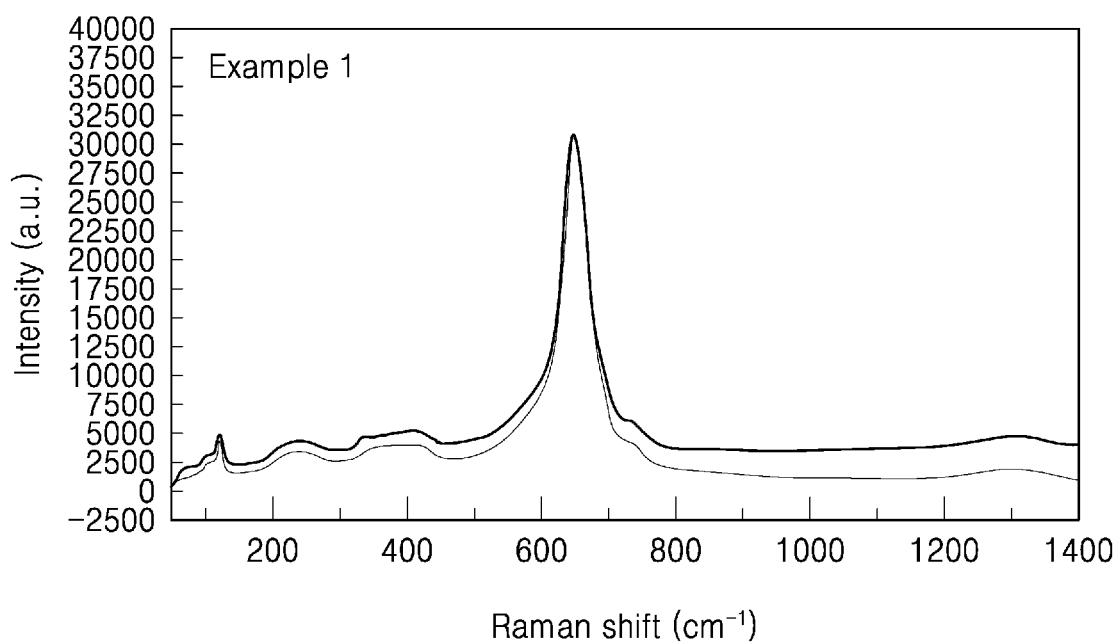
FIG. 3A is a graph of intensity (arbitrary units, a.u.) versus Raman shift (1/centimeter, 1/cm) and shows a Raman spectrum of the solid ion conductor prepared in Example 1.
Figure 3B:
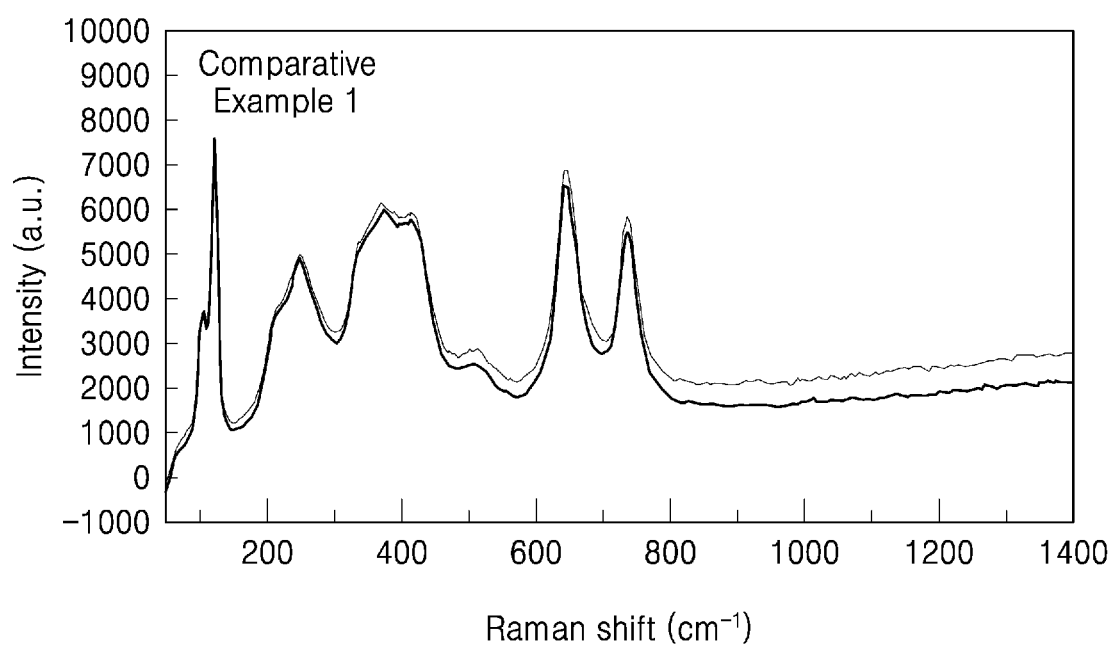
FIG. 3B is a graph of intensity (arbitrary units, a.u.) versus Raman shift (1/centimeter, 1/cm) and shows a Raman spectrum of the solid ion conductor prepared in Comparative Example 1.

The measurement results of the solid ion conductors of Example 1 and Comparative Example 1 are shown in FIGS. 3A and 3B, respectively.

As shown in FIG. 3A, the solid ion conductor of Example 1 exhibits a strong peak at 600 to 800 $cm^{-1}$. This peak was interpreted as a peak due to bond stretching of the Ru—O bond. Accordingly, it was determined that the Ru—O bond was locally present at a high concentration on the surface of the solid ion conductor.

Although it is shown In FIG. 3B that a large number of peaks were also seen in the solid ion conductor of Comparative Example 1, the intensity of the peaks in FIG. 3B was remarkably low in comparison with the strong peak at 600 $cm^{-1}$ to 800 $cm^{-1}$ in FIG. 3A.

Evaluation Example 4: Interfacial Resistance Measurement

A lithium foil having a thickness of 20 μm was disposed on one surface of each of the solid ion conductor pellets prepared in Examples 1 to 8 and Comparative Example 1, and a pressure of 250 MPa was applied thereto at 25° C. by cold isotactic pressing (CIP) to attach a lithium electrode.

A lithium electrode was attached to the opposite surface of the pellet in the same manner to prepare a lithium/solid electrolyte/lithium symmetry cell. A current collector was disposed on each of the lithium electrodes disposed on both surfaces of the pellet, and a part of the current collector protruded toward the outside of the sealed symmetric cell while sealing the symmetric cell to be used as an electrode terminal. The interfacial resistance of the pellet was measured by using prepared symmetric cell.

The impedance of the symmetric cell was measured by a 2-probe method using potentiostat/galvanostat and a 1455 frequency response analyzer (FRA) multi-channel test module (Solatron Analytical, UK) as an impedance analyzer. The measurement of the impedance thereof was carried out under a dryroom atmosphere of an amplitude of 10 mV, a frequency range of 0.1 Hz to $10^6$ Hz, and a dew point of −60 degree at 25° C.

Interfacial resistances were measured from the size of the arc of the Nyguist plot for the impedance measurement results, and some of the results thereof are shown in Table 2.

TABLE 2

|  | Interfacial resistance [Ω · $cm^2$] |
|---|---|
| Example 1 | 27 |
| Example 3 | 14 |
| Example 5 | 34 |
| Example 6 | 40 |
| Comparative Example 1 | 89 |
| Comparative Example 2 | 1970 |

As shown in Table 2, the interfacial resistances of the solid ion conductors of Examples 1, 3, 5, and 6 were remarkably lowered as compared with the solid ion conductors of Comparative Examples 1 and 2.

The interfacial resistance of each of the solid ion conductors of the Examples in which a small amount of metal having electrochemical activity is substituted at the Zr site was remarkably lowered as compared with the solid ion conductor of Comparative Example 1 in which a metal having electrochemical activity is not substituted and the solid ion conductor of Comparative Example 2 in which excessive of a metal having electrochemical activity is substituted. The high interfacial resistance of Comparative Example 2 was determined to be due to the presence of insulating side products caused by side reactions by lithium and an excess of the substituted metal at the interface.

Further, in the solid ion conductors of the Examples, even after 10 hours elapsed from the initial measurement point after manufacturing the symmetric cell, the interface resistance was almost unchanged and maintained at a constant value. Therefore, it was found that the solid ion conductors of the Examples form a stable interface with respect to lithium metal. In contrast, in the solid ion conductor including an excessive amount of a metal having electrochemical activity, such as the solid ion conductor of Comparative Example 2, the interfacial resistance thereof is increased over time and then converged to a constant value.

As found in the Raman spectrum of Evaluation Example 3, it was determined that the high-concentration of Ru—O bonds present on the surface of the solid ion conductor of Example 1 acts as a catalyst for electrode reaction at the interface or increases the affinity between the solid ion conductor and Li, thereby lowering the interfacial resistance. As the thickness of a solid electrolyte layer comprising of the solid ion conductor decreases, a portion of the interface resistance of the solid ion conductor increases compared to the bulk resistance of the solid ion conductor. Accordingly, the internal resistance of a battery employing a solid ion conductor having low interfacial resistance is remarkably lowered, the reversibility of an electrode reaction in the battery is improved, and the cycle characteristics of the battery are improved.

Evaluation Example 5: Charge-Discharge Test

Charge and discharge characteristics of each of the all-solid secondary batteries manufactured in Examples 9 to 16 and Comparative Examples 3 to 4 were evaluated by the following charge-discharge test. The charge-discharge test was performed by putting the all-solid secondary battery into a thermostat at 60° C.

In the first cycle, the secondary battery was charged with a constant current of 0.2 mA/cm$^2$ until the battery voltage reached 4.3 V. Subsequently, the secondary battery was discharged with a constant current of 0.2 mA/cm$^2$ until the battery voltage reached 2.85 V.

In the second cycle, the secondary battery was charged with a constant current of 0.4 mA/cm$^2$ until the battery voltage reached 4.3 V. Subsequently, the secondary battery was discharged with a constant current of 0.4 mA/cm$^2$ until the battery voltage reached 2.85 V.

In the third cycle, the secondary battery was charged with a constant current of 0.6 mA/cm$^2$ until the battery voltage reached 4.3 V. Subsequently, the secondary battery was discharged with a constant current of 0.6 mA/cm$^2$ until the battery voltage reached 2.85 V.

In the fourth cycle, the secondary battery was charged with a constant current of 0.8 mA/cm$^2$ until the battery voltage reached 4.3 V. Subsequently, the secondary battery was discharged with a constant current of 0.8 mA/cm$^2$ until the battery voltage reached 2.85 V.

In the fifth cycle, the secondary battery was charged with a constant current of 1.0 mA/cm$^2$ until the battery voltage reached 4.3 V. Subsequently, the secondary battery was discharged with a constant current of 1.0 mA/cm$^2$ until the battery voltage reached 2.85 V.

In the sixth cycle, the secondary battery was charged with a constant current of 1.2 mA/cm$^2$ until the battery voltage reached 4.3 V. Subsequently, the secondary battery was discharged with a constant current of 1.2 mA/cm$^2$ until the battery voltage reached 2.85 V.

Figure 4:
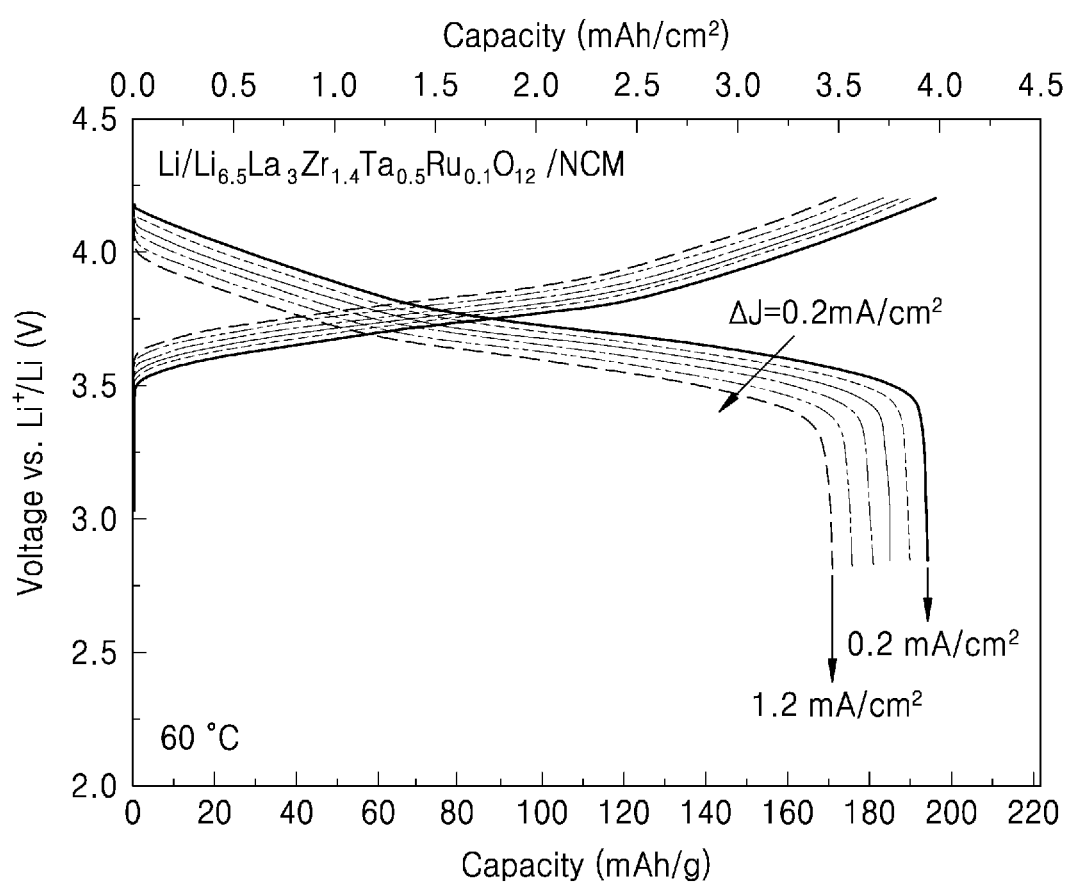
FIG. 4 is a graph of voltage (Volt, V) versus capacity (milliampere-hours per square centimeter, mAh/cm²) and capacity (milliampere-hours per gram) illustrating a charge-discharge profile of the all-solid secondary battery manufactured in Example 9.

FIG. 4 shows a charge-discharge profile of the all-solid secondary battery of Example 9. In FIG. 4, AJ means a difference in charge/discharge current between cycles As shown in FIG. 4, stable charging and discharging was performed over the entire current range.

According to an aspect of an embodiment, a solid ion conductor including a garnet-type oxide of a novel composition provides excellent ion conductivity and reduced interfacial resistance to lithium metals, thereby allowing an electrochemical device including the solid ion conductor to provide excellent charge-discharge characteristics.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor comprising: a garnet-type oxide represented by Formula 2:

$$\text{Li}_A\text{M1}_B(\text{La}_{a1}\text{M2}_{a2})_3(\text{Zr}_{b1}\text{M3}_{b2}\text{M4}_{b3})_2\text{O}_H\text{X}_I \qquad \text{Formula 2}$$

wherein, in Formula 2,

M1 is a monovalent cation, a divalent cation, a trivalent cation, or a combination thereof, M2 is a monovalent cation, a divalent cation, a trivalent cation, or a combination thereof, M3 is Al, Ga, Ta, Nb, Hf, Ti, V, Cr, Co, Ni, Cu, Mo, W, Mg, Tc, Pd, Sc, Cd, In, Sb, Te, Tl, Pt, Si, or a combination thereof, M4 is Ir, Ru, Mn, Sn or a combination thereof, X is a monovalent anion, a divalent anion, a trivalent anion, or a combination thereof, $6 \leq A \leq 8$, $0 \leq B < 2$, $9 \leq H \leq 12$, and $0 \leq I \leq 2$ are satisfied, and $a1+a2=1$, $0<a1\leq1$, $0\leq a2\leq0.067$, $b1+b2+b3=1$, $0<b1<1$, $0<b2<1$, and $0<b3\leq0.1$ are satisfied.

2. The solid ion conductor of claim 1, wherein the garnet-type oxide represented by Formula 2 is a garnet-type oxide represented by Formula 3:

$$\text{Li}_A\text{M1}_B(\text{La}_{a1}\text{M2}_{a2})_3(\text{Zr}_{b1}\text{M5}_{b4}\text{M6}_{b5}\text{M7}_{b6}\text{M8}_{b7})_2\text{O}_H\text{X}_I \qquad \text{Formula 3}$$

wherein, in Formula 3,

M1 is a monovalent cation, a divalent cation, a trivalent cation, or a combination thereof, M2 is a monovalent cation, a divalent cation, a trivalent cation, or a combination thereof, M5, M6, and M7 are different elements, and M5, M6, and M7 are each independently Ta, Nb, Hf, Ti, V, Cr, Co, Ni, Cu, Mo, W, Mg, Tc, Pd, Sc, Cd, In, Sb, Te, Tl, Pt, or Si, M8 is Ir, Ru, Mn, Sn, or a combination thereof, X is a monovalent anion, a divalent anion, a trivalent anion, or a combination thereof, $6 \leq A \leq 8$, $0 \leq B < 2$, $9 \leq H \leq 12$, and $0 \leq I \leq 2$ are satisfied, and a1+a2=1, 0<a1≤1, 0≤a2≤0.067, b1+b4+b5+b6+b7=1, 0<b1<1, 0<b4<1, 0<b5<1, 0≤b6<1, and 0<b7≤0.1 are satisfied.

3. A solid ion conductor comprising a garnet-type oxide represented by Formula 4:

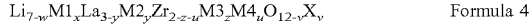   Formula 4 wherein, in Formula 4,

M1 is H, Fe, B, Be, or a combination thereof,

M2 is Ca, Sr, Bi, or a combination thereof,

M3 is Al, Ga, Ta, Nb, Hf, Ti, V, Cr, Co, Ni, Cu, Mo, W, Mg, Tc, Pd, Sc, Cd, In, Sb, Te, Tl, Pt, Si, or a combination thereof, M4 is Ir, Ru, Mn, Sn, or a combination thereof, X is a monovalent anion, a divalent anion, a trivalent anion, or a combination thereof, 0≤x≤2, 0≤y≤0.2, x+y≠0, 0<z<2, 0<u≤0.2, 0<v<2, 0<z+u<2, and w=[a×x]+[(b−3)×y]+[(c−4)×z]+[(d−4)×u]+[(e+2)×v] are satisfied, and a is an oxidation number of M1, b is an oxidation number of M2, c is an oxidation number of M3, d is an oxidation number of M4, and e is an oxidation number of X.

4. The solid ion conductor of claim 2, wherein the garnet-type oxide represented by Formula 3 is a garnet-type oxide represented by Formula 5:

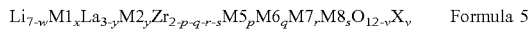   Formula 5 wherein, in Formula 5,

M1 is H, Fe, Ga, Al, B, Be, or a combination thereof,

M2 is Ba, Ca, Sr, Y, Bi, Pr, Nd, Ac, Sm, Gd, or a combination thereof,

M5, M6, and M7 are different elements, and M5, M6, and M7 are each independently Ta, Nb, Hf, Ti, V, Cr, Co, Ni, Cu, Mo, W, Mg, Tc, Pd, Sc, Cd, In, Sb, Te, Tl, Pt, or Si, M8 is Ir, Ru, Mn, Sn, or a combination thereof, X is a monovalent anion, a divalent anion, a trivalent anion, or a combination thereof, 0≤x≤2, 0≤y≤0.2, 0<p<2, 0<q<2, 0≤r<2, 0<s≤0.2, 0<v<2, 0<p+q+r+s<2, and w=[a×x]+[(b−3)×y]+[(f−4)×p]+[(g−4)×q][(h−4)×r]+[(i−4)×s]+[(e+2)×v] are satisfied, and a is an oxidation number of M1, b is an oxidation number of M2, f is an oxidation number of M5, g is an oxidation number of M6, h is an oxidation number of M7, i is an oxidation number of M8, and e is an oxidation number of X.

5. The solid ion conductor of claim 3, wherein, in Formula 4, X is iodine, chlorine, bromine, fluorine, cyanide, cyanate, thiocyanate, azide, or a combination thereof.

6. A solid ion conductor comprising: a garnet-type oxide represented by Formula 6:

   Formula 6 wherein, in Formula 6,

M9 is Al, Ga, Ta, Nb, Hf, Sc, or a combination thereof,

M10 is Ir, Ru, Mn, Sn, or a combination thereof, c is an oxidation number of M9 and d is an oxidation number of M10, and 0<z<2, 0<u≤0.2, 0<z+u<2, and w=[(c−4)×z]+[(d−4)×u] are satisfied.

7. The solid ion conductor of claim 6, wherein M9 is Al, Ga, Ta, Nb, or a combination thereof, and M10 is Ir, Ru, or a combination thereof.

8. The solid ion conductor of claim 7, wherein the garnet-type oxide represented by Formula 6 is a garnet-type oxide represented by Formula 7:

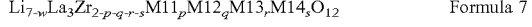   Formula 7 wherein, in Formula 7,

M11, M12, and M13 are different elements, and M11, M12, and M13 are each independently Al, Ga, Ta, Nb, Hf, or Sc, M14 is Ir, Ru, Mn, Sn, or a combination thereof, f is an oxidation number of M11, g is an oxidation number of M12, h is an oxidation number of M13, and i is an oxidation number of M14, and 0<p<2, 0<q<2, 0≤r<2, 0<s≤0.2, 0<p+q+r+s<2, and w=[(f−4)×p]+[(g−4)×q]+[(h−4)×r]+[(i−4)×s] are satisfied.

9. The solid ion conductor of claim 8, wherein M11 is Al, Ga, Ta, Nb, or a combination thereof, M12 and M13 are each independently Hf, Sc, In, or a combination thereof, and M14 is Ir, Ru, Sn, or a combination thereof.

10. The solid ion conductor of claim 6, wherein the garnet-type oxide represented by Formula 6 is a garnet-type oxide represented by any one of the following Formulas:

$Li_{7-w}La_3Zr_{2-z-u}Al_zIr_uO_{12}$ wherein 6≤7-w≤8, 0<z≤1, and 0<u≤0.2, $Li_{7-w}La_3Zr_{2-z-u}Al_zRu_uO_{12}$ wherein 6≤7-w≤8, 0<z≤1, and 0<u≤0.2, $Li_{7-w}La_3Zr_{2-z-u}Al_zMn_uO_{12}$ wherein 6≤7-w≤8, 0<z≤1, and 0<u≤0.2, $Li_{7-w}La_3Zr_{2-z-u}Al_zSn_uO_{12}$ wherein 6≤7-w≤8, 0<z≤1, and 0<u≤0.2;

$Li_{7-w}La_3Zr_{2-z-u}Ga_zIr_uO_{12}$ wherein 6≤7-w≤8, 0<z≤1, and 0<u≤0.2, $Li_{7-w}La_3Zr_{2-z-u}Ga_zRu_uO_{12}$ wherein 6≤7-w≤8, 0<z≤1, and 0<u≤0.2, $Li_{7-w}La_3Zr_{2-z-u}Ga_zMn_uO_{12}$ wherein 6≤7-w≤8, 0<z≤1, and 0<u≤0.2, $Li_{7-w}La_3Zr_{2-z-u}Ga_zSn_uO_{12}$ wherein 6≤7-w≤8, 0<z≤1, and 0<u≤0.2;

$Li_{7-w}La_3Zr_{2-z-u}Ta_zIr_uO_{12}$ wherein 6≤7-w≤8, 0<z≤1, and 0<u≤0.2, $Li_{7-w}La_3Zr_{2-z-u}Ta_zRu_uO_{12}$ wherein 6≤7-w≤8, 0<z≤1, and 0<u≤0.2, $Li_{7-w}La_3Zr_{2-z-u}Ta_zMn_uO_{12}$ wherein 6≤7-w≤8, 0<z≤1, and 0<u≤0.2, $Li_{7-w}La_3Zr_{2-z-u}Ta_zSn_uO_{12}$ wherein 6≤7-w≤8, 0<z≤1, and 0<u≤0.2;

$Li_{7-w}La_3Zr_{2-z-u}Nb_zIr_uO_{12}$ wherein 6≤7-w≤8, 0<z≤1, and 0<u≤0.2, $Li_{7-w}La_3Zr_{2-z-u}Nb_zRu_uO_{12}$ wherein 6≤7-w≤8, 0<z≤1, and 0<u≤0.2, $Li_{7-w}La_3Zr_{2-z-u}Nb_zMn_uO_{12}$ wherein 6≤7-w≤8, 0<z≤1, and 0<u≤0.2, $Li_{7-w}La_3Zr_{2-z-u}Nb_zSn_uO_{12}$ wherein 6≤7-w≤8, 0<z≤1, and 0<u≤0.2;

$Li_{7-w}La_3Zr_{2-p-q-r-s}Al_pHf_qSc_rIr_sO_{12}$ wherein 6≤7-w≤8, 0<p≤1, 0<q≤1, 0<r≤1, 0<s≤0.2, and 0<p+q+r+s<2, $Li_{7-w}La_3Zr_{2-p-q-r-s}Al_pHf_qSc_rRu_sO_{12}$ wherein 6≤7-w≤8, 0<p≤1, 0<q≤1, 0<r≤1, 0<s≤0.2, and 0<p+q+r+s<2, $Li_{7-w}La_3Zr_{2-p-q-r-s}Al_pHf_qSc_rMn_sO_{12}$ wherein 6≤7-w≤8, 0<p≤1, 0<q≤1, 0<r≤1, 0<s≤0.2, and 0<p+q+r+s<2, $Li_{7-w}La_3Zr_{2-p-q-r-s}Al_pHf_qSc_rSn_sO_{12}$ wherein 6≤7-w≤8, 0<p≤1, 0<q≤1, 0<r≤1, 0<s≤0.2, and 0<p+q+r+s<2;

$Li_{7-w}La_3Zr_{2-p-q-r-s}Ga_pHf_qSc_rIr_sO_{12}$ wherein 6≤7-w≤8, 0<p≤1, <q≤1, 0<r≤, 0<s≤0.2, and 0<p+q+r+s<2, $Li_{7-w}La_3Zr_{2-p-q-r-s}Ga_pHf_qSc_rRu_sO12$ wherein 6≤7-w≤8, 0<p≤1, 0<q≤1, 0<r≤1, 0<s≤0.2, and 0<p+q+r+s<2, $Li_{7-w}La_3Zr_{2-p-q-r-s}Ga_pHf_qSc_rMn_sO_{12}$ wherein 6≤7-w≤8, 0<p≤1, 0<q≤1, 0<r≤1, 0<s≤0.2, and 0<p+q+r+s<2, $Li_{7-w}La_3Zr_{2-p-q-r-s}Ga_pHf_qSc_rSn_sO_{12}$ wherein 6≤7-w≤8, 0<p≤1, 0<q≤1, 0<r≤1, and 0<s≤0.2, 0<p+q+r+s<2;

$Li_{7-w}La_3Zr_{2-p-q-r-s}Ta_pHf_qSc_rIr_sO_{12}$ wherein 6≤7-w≤8, 0<p≤1, 0<q≤1, 0<r≤1, 0<s≤0.2, and 0<p+q+r+s<2, $Li_{7-w}La_3Zr_{2-p-q-r-s}Ta_pHf_qSc_rRu_sO_{12}$ wherein 6≤7-w≤8, $0<p\leq1$, $0<q\leq1$, $0<r\leq1$, $0<s\leq0.2$, and $0<p+q+r+s<2$, $Li_{7-w}La_3Zr_{2-p-q-r-s}Ta_pHf_qSc_rMn_sO_{12}$ wherein $6\leq7-w\leq8$, $0<p\leq1$, $0<q\leq1$, $0<r\leq1$, $0<s\leq0.2$, and $0<p+q+r+s<2$, $Li_{7-w}La_3Zr_{2-p-q-r-s}Ta_pHf_qSc_rSn_sO_{12}$ wherein $6\leq7-w\leq8$, $0<p\leq1$, $0<q\leq1$, $0<r\leq1$, $0<s\leq0.2$, and $0<p+q+r+s<2$;

$Li_{7-w}La_3Zr_{2-p-q-r-s}Nb_pHf_qSc_rIr_sO_{12}$ wherein $6\leq7-w\leq8$, $0<p\leq1$, $<q\leq1$, $0<r\leq$, $0<s\leq0.2$, and $0<p+q+r+s<2$, $Li_{7-w}La_3Zr_{2-p-q-r-s}Nb_pHf_qSc_rRu_sO_{12}$ wherein $6\leq7-w\leq8$, $0<p\leq1$, $0<q\leq1$, $0<r\leq1$, $0<s\leq0.2$, and $0<p+q+r+s<2$, $Li_{7-w}La_3Zr_{2-p-q-r-s}Nb_pHf_qSc_rMn_sO_{12}$ wherein $6\leq7-w\leq8$, $0<p\leq1$, $0<q\leq1$, $0<r\leq1$, $0<s\leq0.2$, and $0<p+q+r+s<2$, or $Li_{7-w}La_3Zr_{2-p-q-r-s}Nb_pHf_qSc_rSn_sO_{12}$ wherein $6\leq7-w\leq8$, $0<p\leq1$, $<q\leq1$, $0<r\leq$, $0<s\leq0.2$, and $0<p+q+r+s<2$.

11. The solid ion conductor of claim 1, wherein the garnet-type oxide represented by Formula 2 is a garnet-type oxide represented by any one of the following Formulas:

$Li_{7.5}La_3Zr_{1.4}Al_{0.5}Ir_{0.1}O_{12}$, $Li_{7.5}La_3Zr_{1.3}Al_{0.5}Ir_{0.2}O_{12}$,
$Li_{7.5}La_3Zr_{1.4}Ga_{0.5}Ir_{0.1}O_{12}$, $Li_{7.5}La_3Zr_{1.3}Ga_{0.5}Ir_{0.2}O_{12}$,
$Li_{6.5}La_3Zr_{1.4}Ta_{0.5}Ir_{0.1}O_{12}$, $Li_{6.5}La_3Zr_{1.3}Ta_{0.5}Ir_{0.2}O_{12}$,
$Li_{6.5}La_3Zr_{1.4}Nb_{0.5}Ir_{0.1}O_{12}$, $Li_{6.5}La_3Zr_{1.3}Nb_{0.5}Ir_{0.2}O_{12}$;
$Li_{7.5}La_3Zr_{1.4}Al_{0.5}Ru_{0.1}O_{12}$, $Li_{7.5}La_3Zr_{1.3}Al_{0.5}Ru_{0.2}O_{12}$,
$Li_{7.5}La_3Zr_{1.4}Ga_{0.5}Ru_{0.1}O_{12}$,
$Li_{7.5}La_3Zr_{1.3}Ga_{0.5}Ru_{0.2}O_{12}$,
$Li_{6.5}La_3Zr_{1.4}Ta_{0.5}Ru_{0.1}O_{12}$,
$Li_{6.5}La_3Zr_{1.3}Ta_{0.5}Ru_{0.2}O_{12}$,
$Li_{6.5}La_3Zr_{1.4}Nb_{0.5}Ru_{0.1}O_{12}$,
$Li_{6.5}La_3Zr_{1.3}Nb_{0.5}Ru_{0.2}O_{12}$;
$Li_{7.5}La_3Zr_{1.4}Al_{0.5}Mn_{0.1}O_{12}$, $Li_{7.5}La_3Zr_{1.3}Al_{0.5}Mn_{0.2}O_{12}$,
$Li_{7.5}La_3Zr_{1.4}Ga_{0.5}Mn_{0.1}O_{12}$,
$Li_{7.5}La_3Zr_{1.3}Ga_{0.5}Mn_{0.2}O_{12}$,
$Li_{6.5}La_3Zr_{1.4}Ta_{0.5}Mn_{0.1}O_{12}$,
$Li_{6.5}La_3Zr_{1.3}Ta_{0.5}Mn_{0.2}O_{12}$,
$Li_{6.5}La_3Zr_{1.4}Nb_{0.5}Mn_{0.1}O_{12}$,
$Li_{6.5}La_3Zr_{1.3}Nb_{0.5}Mn_{0.2}O_{12}$;
$Li_{7.5}La_3Zr_{1.4}Al_{0.5}Sn_{0.1}O_{12}$, $Li_{7.5}La_3Zr_{1.3}Al_{0.5}Sn_{0.2}O_{12}$,
$Li_{7.5}La_3Zr_{1.4}Ga_{0.5}Sn_{0.1}O_{12}$,
$Li_{7.5}La_3Zr_{1.3}Ga_{0.5}Sn_{0.2}O_{12}$,
$Li_{6.5}La_3Zr_{1.4}Ta_{0.5}Sn_{0.1}O_{12}$,
$Li_{6.5}La_3Zr_{1.3}Ta_{0.5}Sn_{0.2}O_{12}$,
$Li_{6.5}La_3Zr_{1.4}Nb_{0.5}Sn_{0.1}O_{12}$,
$Li_{6.5}La_3Zr_{1.3}Nb_{0.5}Sn_{0.2}O_{12}$;
$Li_{7.98}La_3Zr_{0.49}Al_{0.49}Hf_{0.49}Sc_{0.49}Ir_{0.04}O_{12}$,
$Li_{7.95}La_3Zr_{0.475}Al_{0.475}Hf_{0.475}Sc_{0.475}Ir_{0.1}O_{12}$,
$Li_{7.98}La_3Zr_{0.49}Ga_{0.49}Hf_{0.49}Sc_{0.49}Ir_{0.04}O_{12}$,
$Li_{7.95}La_3Zr_{0.475}Ga_{0.475}Hf_{0.475}Sc_{0.475}Ir_{0.1}O_{12}$,
$Li_7La_3Zr_{0.49}Ta_{0.49}Hf_{0.49}Sc_{0.49}Ir_{0.04}O_{12}$,
$Li_7La_3Zr_{0.475}Ta_{0.475}Hf_{0.475}Sc_{0.475}Ir_{0.1}O_{12}$,
$Li_7La_3Zr_{0.49}Nb_{0.49}Hf_{0.49}Sc_{0.49}Ir_{0.04}O_{12}$,
$Li_7La_3Zr_{0.475}Nb_{0.475}Hf_{0.475}Sc_{0.475}Ir_{0.1}O_{12}$;
$Li_{7.98}La_3Zr_{0.49}Al_{0.49}Hf_{0.49}Sc_{0.49}Ru_{0.04}O_{12}$,
$Li_{7.95}La_3Zr_{0.475}Al_{0.475}Hf_{0.475}Sc_{0.475}Ru_{0.1}O_{12}$,
$Li_{7.98}La_3Zr_{0.49}Ga_{0.49}Hf_{0.49}Sc_{0.49}Ru_{0.04}O_{12}$,
$Li_{7.95}La_3Zr_{0.475}Ga_{0.475}Hf_{0.475}Sc_{0.475}Ru_{0.1}O_{12}$,
$Li_7La_3Zr_{0.49}Ta_{0.49}Hf_{0.49}Sc_{0.49}Ru_{0.04}O_{12}$,
$Li_7La_3Zr_{0.475}Ta_{0.475}Hf_{0.475}Sc_{0.475}Ru_{0.1}O_{12}$,
$Li_7La_3Zr_{0.49}Nb_{0.49}Hf_{0.49}Sc_{0.49}Ru_{0.04}O_{12}$,
$Li_7La_3Zr_{0.475}Nb_{0.475}Hf_{0.475}Sc_{0.475}Ru_{0.1}O_{12}$;
$Li_{7.98}La_3Zr_{0.49}Al_{0.49}Hf_{0.49}Sc_{0.49}Mn_{0.04}O_{12}$,
$Li_{7.95}La_3Zr_{0.475}Al_{0.475}Hf_{0.475}Sc_{0.475}Mn_{0.1}O_{12}$,
$Li_{7.98}La_3Zr_{0.49}Ga_{0.49}Hf_{0.49}Sc_{0.49}Mn_{0.04}O_{12}$,
$Li_{7.95}La_3Zr_{0.475}Ga_{0.475}Hf_{0.475}Sc_{0.475}Mn_{0.1}O_{12}$,
$Li_7La_3Zr_{0.49}Ta_{0.49}Hf_{0.49}Sc_{0.49}Mn_{0.04}O_{12}$,
$Li_7La_3Zr_{0.475}Ta_{0.475}Hf_{0.475}Sc_{0.475}Mn_{0.1}O_{12}$,
$Li_7La_3Zr_{0.49}Nb_{0.49}Hf_{0.49}Sc_{0.49}Mn_{0.04}O_{12}$,
$Li_7La_3Zr_{0.475}Nb_{0.475}Hf_{0.475}Sc_{0.475}Mn_{0.1}O_{12}$;
$Li_{7.98}La_3Zr_{0.49}Al_{0.49}Hf_{0.49}Sc_{0.49}Sn_{0.04}O_{12}$,
$Li_{7.95}La_3Zr_{0.475}Al_{0.475}Hf_{0.475}Sc_{0.475}Sn_{0.1}O_{12}$,
$Li_{7.98}La_3Zr_{0.49}Ga_{0.49}Hf_{0.49}Sc_{0.49}Sn_{0.04}O_{12}$,
$Li_{7.95}La_3Zr_{0.475}Ga_{0.475}Hf_{0.475}Sc_{0.475}Sn_{0.1}O_{12}$,
$Li_7La_3Zr_{0.49}Ta_{0.49}Hf_{0.49}Sc_{0.49}Sn_{0.04}O_{12}$,
$Li_7La_3Zr_{0.475}Ta_{0.475}Hf_{0.475}Sc_{0.475}Sn_{0.1}O_{12}$,
$Li_7La_3Zr_{0.49}Nb_{0.49}Hf_{0.49}Sc_{0.49}Sn_{0.04}O_{12}$, or
$Li_7La_3Zr_{0.475}Nb_{0.475}Hf_{0.475}Sc_{0.475}Sn_{0.1}O_{12}$.

12. The solid ion conductor of claim 1, wherein the garnet-type oxide includes a cubic phase.

13. The solid ion conductor of claim 1, wherein lithium ion conductivity of the solid ion conductor is about $1.0\times10^{-4}$ S/cm to about $1.0\times10^{-3}$ S/cm.

14. The solid ion conductor of claim 1, wherein activation energy of the solid ion conductor in a temperature range of about 25° C. to about 100° C. is about 0.3 eV to about 0.4 eV.

15. The solid ion conductor of claim 1, wherein the solid ion conductor has a peak at about 600 $cm^{-1}$ to about 800 $cm^{-1}$ in a Raman spectrum.

16. The solid ion conductor of claim 1, wherein an interfacial resistance between the solid ion conductor and a lithium metal is about 1 $\Omega\cdot cm^2$ to about 60 $\Omega\cdot cm^2$, when determined by impedance spectroscopy of a lithium symmetric cell and disposed between lithium metal electrodes and at a temperature of 25° C. in a frequency range of about 0.1 Hz to about $10^6$ Hz.

17. A solid electrolyte comprising the solid ion conductor of claim 1.

18. An electrochemical device comprising:
a cathode;
an anode; and
a solid electrolyte layer disposed between the cathode and the anode,
wherein the cathode, the anode, the solid electrolyte layer, or a combination thereof, comprises the solid ion conductor of claim 1.

19. The electrochemical device of claim 18, further comprising a cathode protection layer, an anode protection layer, a solid electrolyte protection layer, or a combination thereof.

20. The electrochemical device of claim 18, wherein the electrochemical device is an all-solid secondary battery or a metal air battery.

21. A method of preparing the solid ion conductor of claim 1, the method comprising:
providing a precursor mixture comprising a precursor for forming the solid ion conductor; and
heat-treating the precursor mixture under an oxidative atmosphere to provide the solid ion conductor comprising a garnet-type oxide represented by Formula 2:

$$Li_AM1_B(La_{a1}M2_{a2})_3(Zr_{b1}M3_{b2}M4_{b3})_2O_HX_I \quad \text{Formula 2}$$

wherein, in Formula 2,
M1 is a monovalent cation, a divalent cation, a trivalent cation, or a combination thereof,
M2 is a monovalent cation, a divalent cation, a trivalent cation, or a combination thereof,
M3 is Al, Ga, Ta, Nb, Hf, Ti, V, Cr, Co, Ni, Cu, Mo, W, Mg, Tc, Sc, Cd, In, Sb, Te, Tl, Pt, Si, or a combination thereof,
M4 is Ir, Ru, Mn, or a combination thereof,
X is a monovalent anion, a divalent anion, a trivalent anion, or a combination thereof, and
$6\leq A\leq8$, $0\leq B<2$, $9\leq H\leq12$, and $0\leq I\leq2$ are satisfied, and
$a1+a2=1$, $0<a1\leq1$, $0\leq a2\leq0.067$, $b1+b2+b3=1$, $0<b1<1$, $0<b2<1$, and $0<b3\leq0.1$ are satisfied.

22. The method of claim 21, wherein the heat-treating of the precursor mixture comprises heat-treating at about 600° C. to about 1100° C.

23. The method of claim 21, further comprising:
molding the solid ion conductor to prepare a molded product; and
heat-treating the molded product at about 900° C. to about 1500° C. to prepare a sintered product, wherein the molded product is heat treated at a higher temperature than the precursor mixture.

* * * * *